US 6,551,768 B2

(12) United States Patent
Slusarek et al.

(10) Patent No.: US 6,551,768 B2
(45) Date of Patent: *Apr. 22, 2003

(54) IMAGING ELEMENT CONTAINING A BLOCKED PHOTOGRAPHICALLY USEFUL COMPOUND

(75) Inventors: Wojciech K. Slusarek, Rochester, NY (US); Xiqiang Yang, Webster, NY (US); David H. Levy, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 13 days.

This patent is subject to a terminal disclaimer.

(21) Appl. No.: 09/865,838

(22) Filed: May 25, 2001

(65) Prior Publication Data

US 2002/0018972 A1 Feb. 14, 2002

Related U.S. Application Data

(60) Provisional application No. 60/211,069, filed on Jun. 13, 2000.

(51) Int. Cl.$^7$ ................................................ G03C 1/46
(52) U.S. Cl. ..................... 430/505; 430/566; 430/955; 430/959; 430/351; 430/380; 430/542
(58) Field of Search ................ 430/505, 566, 430/955, 959, 351, 380, 542

(56) References Cited

U.S. PATENT DOCUMENTS

| 4,610,957 | A | | 9/1986 | Kato et al. | |
|---|---|---|---|---|---|
| 6,242,166 | B1 | * | 6/2001 | Irving et al. | 430/21 |
| 6,312,879 | B1 | * | 11/2001 | Slusarek et al. | 430/415 |
| 6,350,566 | B2 | * | 2/2002 | Irving et al. | 430/351 |
| 6,413,708 | B1 | * | 7/2002 | Slusarek et al. | 430/566 |

OTHER PUBLICATIONS

J. March, "Advanced Organic Chemistry" Fourth Edition, John Wiley & Sons, 1992, New York—Chichester—Brisbane—Toronto—Singapore, p. 1093.

* cited by examiner

Primary Examiner—Geraldine Letscher
(74) Attorney, Agent, or Firm—Chris P. Konkol

(57) ABSTRACT

Blocked photographically useful groups decompose thermally via a Lossen rearrangement reaction, including, for example, compounds represented by the following structure:

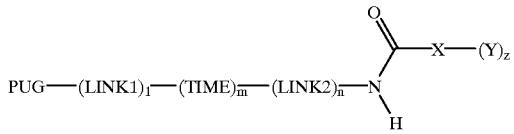

In the above structure, the substituents are as defined in the application. Such compounds have good reactivity and can by used to block photographically useful compounds such as developing agents until thermally activated under preselected conditions. Compounds according to the present invention are especially useful in color photothermographic imaging elements.

31 Claims, No Drawings

IMAGING ELEMENT CONTAINING A BLOCKED PHOTOGRAPHICALLY USEFUL COMPOUND

This application claims the benefit of Provisional application Ser. No. 60/211,069, filed Jun. 13, 2000.

FIELD OF THE INVENTION

The present invention relates to an imaging element containing a blocked photographically useful compound that decomposes thermally via a Lossen rearrangement reaction.

BACKGROUND OF THE INVENTION

In conventional color photography, films containing light-sensitive silver halide are employed in hand-held cameras. Upon exposure, the film carries a latent image that is only revealed after suitable processing. These elements have historically been processed by treating the camera-exposed film with at least a developing solution having a developing agent that acts to form an image in cooperation with components in the film. Developing agents commonly used are reducing agents, for example, p-aminophenols or p-phenylenediamines.

Typically, developing agents (also herein referred to as developers) present in developer solutions are brought into reactive association with exposed photographic film elements at the time of processing. Segregation of the developer and the film element has been necessary because the incorporation of developers directly into sensitized photographic elements can lead to desensitization of the silver halide emulsion and undesirable fog. Considerable effort, however, has been directed to producing effective blocked developing agents (also referred to herein as blocked developers) that might be introduced into silver halide emulsion elements without deleterious desensitization or fog effects. Accordingly, blocked developing agents have been sought that would unblock under preselected conditions of development after which such developing agents would be free to participate in image-forming (dye or silver metal forming) reactions.

U.S. Pat. No. 3,342,599 to Reeves discloses the use of Schiff-base developer precursors. Schleigh and Faul, in a *Research Disclosure* (129 (1975) pp. 27–30), describe the quaternary blocking of color developers and the acetamido blocking of p-phenylenediamines. (All Research Disclosures referenced herein are published by Kenneth Mason Publications, Ltd., Dudley Annex, 12a North Street, Emsworth, Hampshire P010 7DQ, ENGLAND.) Subsequently, U.S. Pat. No. 4,157,915 to Hamaoka et al. and U.S. Pat. No. 4,060,418 to Waxman and Mourning describe the preparation and use of blocked p-phenylenediamines in an image-receiving sheet for color diffusion transfer.

All of these approaches have failed in practical product applications because of one or more of the following problems: desensitization of sensitized silver halide; unacceptably slow unblocking kinetics; instability of blocked developer yielding increased fog and/or decreased Dmax after storage, lack of simple methods for releasing the blocked developer, inadequate or poor image formation, and other problems. Especially in the area of photothermographic color films, other potential problems include poor discrimination and poor dye-forming activity.

Recent developments in blocking and switching chemistry have led to blocked developing agents, including p-phenylenediamines, that perform relatively well. In particular, compounds having "β-ketoester" type blocking groups (strictly, β-ketoacyl blocking groups) are described in U.S. Pat. No. 5,019,492. With the advent of the β-ketoester blocking chemistry, it has become possible to incorporate p-phenylenediamine developers in film systems in a form from which they only become active when required for development. The β-ketoacyl blocked developers are released from the film layers in which they are incorporated by an alkaline developing solution containing a dinucleophile, for example hydroxylamine.

Lossen rearrangement is a well documented chemical reaction that is used to produce amines (J. March, "Advanced Organic Chemistry" Fourth Edition, John Wiley & Sons, 1992, New York—Chichester—Brisbane—Toronto —Singapore, p.1093). This approach was used to thermally release carboxylic acids from simple blocked precursors (U.S. Pat. No. 4,610,957 to Kato and Kitaguchi, 1986), and no timing groups were employed.

PROBLEM TO BE SOLVED BY THE INVENTION

There remains a need for blocked photographically useful compounds with good keeping properties, which at the same time exhibit good unblocking kinetics. With respect to developing agents, it is an object to obtain a film incorporating blocked developing agents that provide good dye-forming activity and which, at the same time, yield little or no increased fog and/or provide little or no decrease in Dmax after storage.

SUMMARY OF THE INVENTION

This application describes a new class of blocked photographically useful groups (PUG), decomposing thermally via Lossen rearrangement, that performs better than other classes of blocked PUGS. The invention further relates to a light sensitive photographic element comprising a support and a compound having a blocked compound as described above that releases a photographically useful group on thermal activation.

In one embodiment of the invention, the photographically useful group is a developer in a photothermographic color film. Preferably, when the developer is used in a dry physical development system, the developer is thermally activated at temperatures between about 100 and 160° C. When the developer is used in the presence of some water, in a low volume (even apparently dry) chemical development system, however, the developer is preferably thermally activated at temperatures between about 20 and 100° C. in the presence of added acid, base or water.

The invention additionally relates to a method of image formation having the steps of: thermally developing an imagewise exposed photographic element having a blocked compound as described above that decomposes (i.e., unblocks) on thermal activation to release a photographically useful group to form a developed image. Preferably, following development, the developed image is then scanned to form a fist electronic-image representation (or "electronic record") from said developed image, the first electronic record is digitized to form a digital image, and the digital image is modified to form a second electronic-image representation, which can be stored, transmitted, printed or displayed.

The invention further relates to a one-time use camera having a light sensitive photographic element comprising a support and a blocked compound as described above that releases a photographically useful group on thermal activation. The invention further relates to a method of image formation having the steps of imagewise exposing such a light sensitive photographic element in a one-time-use camera having a heater and thermally processing the exposed element in the camera.

DETAILED DESCRIPTION OF THE INVENTION

The new class of compounds according to the present invention, having blocked photographically useful groups (PUG) that decompose thermally via Lossen rearrangement, are represented by the following Structure I:

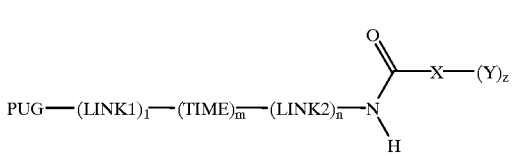

wherein:
PUG is a photographically useful group in which the PUG is connected to the remainder of the molecule by a heteroatom;
LINK1 and LINK2 are linking groups;
TIME is a timing group;
l is 0 or 1;
m is 0 or 1;
n is 0 or 1;
provided that when m=0 then l=0;
X is carbon atom, aryl group or heteroaromatic group;
Y is z independently selected substituents, electron donating or electron withdrawing, wherein z is 0 to 7; additionally two substituents Y can join to form a ring. Suitable heteroatoms are oxygen, nitrogen and sulfur. In one embodiment, when n=0, then l=1, although it is not required in other embodiments. The timing group, if present, is preferably connected to the LINK2 via an oxygen, sulfur, or nitrogen atom, more preferably through an oxygen atom.

In one embodiment, the compounds according to the invention are represented by the following Structure II

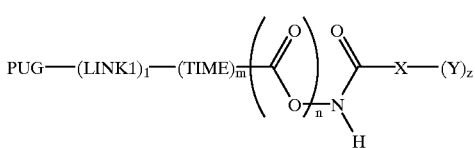

wherein the groups are as defined above. In a preferred embodiment, n is 1.

In another embodiment of the invention, the compounds according to the present invention are represented by compounds having the following Structure III:

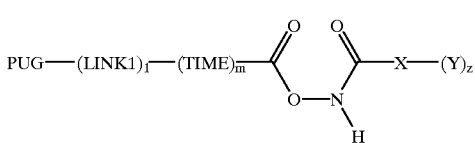

wherein:
PUG is a photographically useful group;
LINK1 is a linking group;
TIME is a timing group;
l is 0 or 1;
m is 0 or 1;
provided that when m=0 then l=0 and when m=1 then l=1 or 0;
further provided that when m=0 and l=0 than PUG≠alkyl, aryl and heterocyclic groups,
X is carbon atom, aryl group or heteroaromatic group;
Y is z independently selected substituents, electron donating or electron withdrawing, wherein z is 0 to 7; additionally two substituents Y can join to form a ring. Preferably, PUG is connected to the remainder of the molecule via a heteroatom.

When reference in this application is made to a particular moiety or group, "substituted or unsubstituted" means that the moiety may be unsubstituted or substituted with one or more substituents (up to the maximum possible number), for example, substituted or unsubstituted alkyl, substituted or unsubstituted benzene (with up to five substituents), substituted or unsubstituted heteroaromatic (with up to five substituents), and substituted or unsubstituted heterocyclic (with up to five substituents). Generally, unless otherwise specifically stated, substituent groups usable on molecules herein include any groups, whether substituted or unsubstituted, which do not destroy properties necessary for the photographic utility. Examples of substituents on any of the mentioned groups can include known substituents, such as: halogen, for example, chloro, fluoro, bromo, iodo; alkoxy, particularly those "lower alkyl" (that is, with 1 to 6 carbon atoms), for example, methoxy, ethoxy; substituted or unsubstituted alkyl, particularly lower alkyl (for example, methyl, trifluoromethyl); thioalkyl (for example, methylthio or ethylthio), particularly either of those with 1 to 6 carbon atoms; substituted and unsubstituted aryl, particularly those having from 6 to 20 carbon atoms (for example, phenyl); and substituted or unsubstituted heteroaryl, particularly those having a 5 or 6-membered ring containing 1 to 3 heteroatoms selected from N, O, or S (for example, pyridyl, thienyl, furyl, pyrrolyl); acid or acid salt groups such as any of those described below; and others known in the art. Alkyl substituents may specifically include "lower alkyl" (that is, having 1–6 carbon atoms), for example, methyl, ethyl, and the like. Cycloalkyl when appropriate includes bicycloalkyl. Further, with regard to any alkyl group or alkylene group, it will be understood that these can be branched, unbranched, or cyclic. Preferred substituents in Structure I and II include, for example, halogens such as chlorine, fluorine, nitro, alkoxy, alkyl, phenyl, and sulfonyl. The term "ring" includes substituted or unsubstituted rings that are saturated, unsaturated, aromatic, or heterocyclic and have at least 4 ring atoms, including 1 to 10 carbon atoms, preferably 4 to 8 carbon atoms.

When referring to heteroaromatic groups or substituents, the heteroaromatic group is preferably a 5- or 6-membered ring containing one or more hetero atoms, such as N, O, S or Se. Preferably, the heteroaromatic group comprises a substituted or unsubstituted benzimidazolyl, benzothiazolyl, benzoxazolyl, benzothienyl, benzofuryl, furyl, imidazolyl, indazolyl, indolyl, isoquinolyl, isothiazolyl, isoxazolyl, oxazolyl, picolinyl, purinyl, pyranyl, pyrazinyl, pyrazolyl, pyridyl, pyrimidinyl, pyrrolyl, quinaldinyl, quinazolinyl, quinolyl, quinoxalinyl, tetrazolyl, thiadiazolyl, thiatriazolyl, thiazolyl, thienyl, and triazolyl group. Particularly preferred are: 2-imidazolyl, 2-benzimidazolyl, 2-thiazolyl, 2-benzothiazolyl, 2-oxazolyl, 2-benzoxazolyl, 2-pyridyl, 2-quinolinyl, 1-isoquinolinyl, 2-pyrrolyl, 2-indolyl, 2-thiophenyl, 2-benzothiophenyl, 2-furyl, 2-benzofuryl, 2-,4-, or 5-pyrimidinyl, 2-pyrazinyl, 3-,4-, or 5-pyrazolyl, 3-indazolyl, 2- and 3-thienyl, 2-(1,3,4-triazolyl), 4- or 5-(1, 2,3-triazolyl), 5-(1,2,3,4-tetrazolyl). The heterocyclic group may be further substituted. Preferred substituents are alkyl and alkoxy groups containing 1 to 6 carbon atoms.

When referring to electron withdrawing or electron donating groups, this can be indicated or estimated by the Hammett substituent constants ($\sigma_p$, $\sigma_m$), as described by L. P. Hammett in Physical Organic Chemistry (McGraw-Hill Book Co., NY, 1940), or by the Taft polar substituent constants ($\sigma_I$) as defined by R. W. Taft in Steric Effects in Organic Chemistry (Wiley and Sons, NY, 1956), and in other standard organic textbooks. The $\sigma_p$ and $\sigma_m$ parameters, which were used first to characterize the ability of benzene ring-substituents (in the para or meta position) to affect the electronic nature of a reaction site, were originally quantified by their effect on the pKa of benzoic acid. Subsequent work has extended and refined the original concept and data, and for the purposes of prediction and correlation, standard sets of $\sigma_p$ and $\sigma_m$ are widely available in the chemical literature, as for example in C. Hansch et al., J. Med. Chem., 17, 1207 (1973). For substituents attached to a tetrahedral carbon instead of aryl groups, the inductive substituent constant $\sigma_I$ is herein used to characterize the electronic property. Preferably, an electron withdrawing group on an aryl ring has a $\sigma_p$ or $\sigma_m$ of greater than zero, more preferably greater than 0.05, most preferably greater than 0.1. The $\sigma_p$ is used to define electron withdrawing groups on aryl groups when the substituent is neither para nor meta. Similarly, an electron withdrawing group on a tetrahedral carbon preferably has a $\sigma_I$ of greater than zero, more preferably greater than 0.05, and most preferably greater than 0.1. When more than one electron withdrawing group is present, then the summation of the substituent constants is used to estimate or characterize the total effect of the substituents.

In Structure I and II above, the PUG can be, for example, a photographic dye or photographic reagent. A photographic reagent herein is a moiety that upon release further reacts with components in the photographic element. Such photographically useful groups include, for example, couplers (such as, image dye-forming couplers, development inhibitor releasing couplers, competing couplers, polymeric couplers and other forms of couplers), development inhibitors, bleach accelerators, bleach inhibitors, inhibitor releasing developers, dyes and dye precursors, developing agents (such as competing developing agents, dye-forming developing agents, developing agent precursors, and silver halide developing agents), silver ion fixing agents, electron transfer agents, silver halide solvents, silver halide complexing agents, reductones, image toners, pre-processing and post-processing image stabilizers, hardeners, tanning agents, fogging agents, ultraviolet radiation absorbers, nucleators, chemical and spectral sensitizers or desensitizers, surfactants, and precursors thereof and other addenda known to be useful in photographic materials. In the case of development inhibitors, the functional (unblocked) compound preferably functions by interaction with silver, preferably in a heterogenous reaction, rather acting as an acid. The PUG can be present in the blocked compound as a preformed species or as a precursor. For example, a preformed development inhibitor may be bonded to the blocking group or the development inhibitor may be attached to a timing group that is released at a particular time and location in the photographic material. The PUG may be, for example, a preformed dye or a compound that forms a dye after release from the blocking group.

During the unblocking reaction involving compounds of the present invention, preferably no carboxylic acid molecule (or salt thereof) is produced as a final (non-temporary) product of reaction, unless there is already a carboxylic acid group on the PUG before the unblocking reaction. In the case where a linking group is present in the compounds of the present invention, the linking group may be converted to a small neutral molecule, for example, in the case where a carbonyl linking group is present, carbon dioxide is typically one of the reaction products, in addition to the unblocked PUG and the leaving (blocking) group. In one embodiment, the reaction takes place at pH below 8.0, preferably at a pH that is about neutral or below. The imaging element of the present invention does not require the release of a base from a base precursors, by heating, for development, which is absent in the preferred embodiment of the imaging element of the present invention.

In preferred embodiments of the invention the PUG is a developing agent. The developing agent can be a color developing agent, a black-and-white developing agent or a cross-oxidized developing agent. They include aminophenols, phenylenediamines, hydroquinones, pyrazolidinones, and hydrazines. Illustrative developing agents are described in U.S. Pat. Nos. 2,193,015, 2,108,243, 2,592,364, 3,656,950, 3,658,525, 2,751,297, 2,289,367, 2,772,282, 2,743,279, 2,753,256, and 2,304,953, the entire disclosures of which are incorporated herein by reference.

Illustrative PUG groups that are useful as developers are:

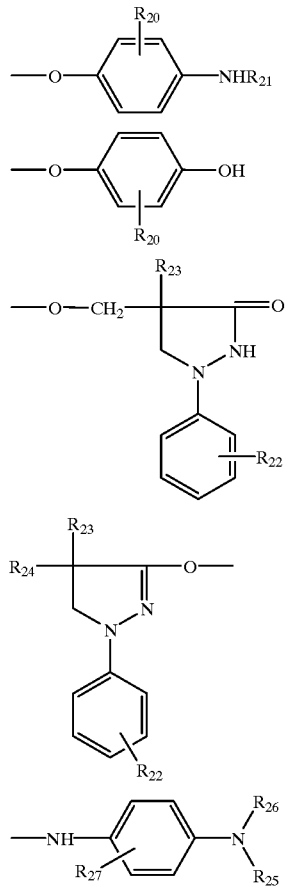

-continued

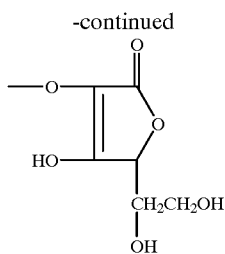

wherein

R$_{20}$ is hydrogen, halogen, alkyl or alkoxy;

R$_{21}$ is a hydrogen or alkyl;

R$_{22}$ is hydrogen, alkyl, alkoxy or alkenedioxy; and

R$_{23}$, R$_{24}$, R$_{25}$ R$_{26}$ and R$_{27}$ are hydrogen alkyl, hydroxyalkyl or sulfoalkyl.

In the above Structure I, in a preferred embodiment of the invention, LINK1 and LINK2 are linking groups independently (the same or different) of Structure IV:

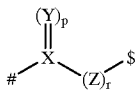

IV wherein

X represents carbon or sulfur;

Y represents oxygen, sulfur of N—R$_1$, where R$_1$ is substituted or unsubstituted alkyl or substituted or unsubstituted aryl;

p is 1 or 2;

Z represents carbon, oxygen or sulfur;

r is 0 or 1;

with the proviso that when X is carbon, both p and r are 1, when X is sulfur, Y is oxygen, p is 2 and r is 0;

\# denotes the bond to PUG:

$ denotes the bond to TIME.

Illustrative linking groups include, for example,

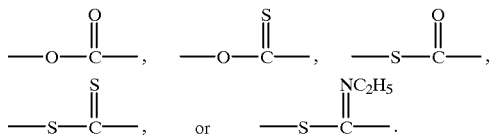

TIME is a timing group. Such groups are well-known in the art such as (1) groups utilizing an aromatic nucleophilic substitution reaction as disclosed in U.S. Pat. No. 5,262,291; (2) groups utilizing the cleavage reaction of a hemiacetal (U.S. Pat. No. 4,146,396, Japanese Applications 60-249148; 60-249149); (3) groups utilizing an electron transfer reaction along a conjugated system (U.S. Pat. Nos. 4,409,323; 4,421,845; Japanese Applications 57-188035; 58-98728; 58-209736; 58-209738); and (4) groups using an intramolecular nucleophilic substitution reaction (U.S. Pat. No. 4,248,962).

Illustrative timing groups are illustrated by formulae T-1 through T-4.

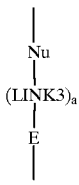

T-1 wherein:

Nu is a nucleophilic group;

E is an electrophilic group comprising one or more carbo- or hetero-aromatic rings, containing an electron deficient carbon atom;

LINK1 is a linking group that provides 1 to 5 atoms in the direct path between the nucleophilic site of Nu and the electron deficient carbon atom in E; and a is 0 or 1.

Such timing groups include, for example:

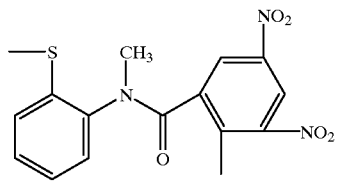

And

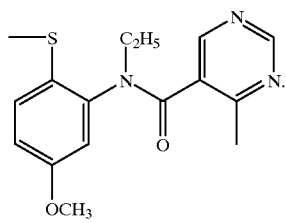

These timing groups are described more fully in U.S. Pat. No. 5,262,291, incorporated herein by reference.

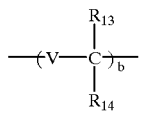

T-2 wherein

V represents an oxygen atom, a sulfur atom, or an

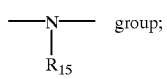

group;

R$_{13}$ and R$_{14}$ each represents a hydrogen atom or a substituent group;

R$_{15}$ represents a substituent group; and b represents 1 or 2.

Typical examples of R$_{13}$ and R$_{14}$, when they represent substituent groups, and R$_{15}$ include

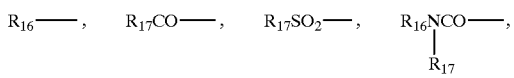

and

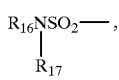

where, $R_{16}$ represents an aliphatic or aromatic hydrocarbon residue, or a heterocyclic group; and $R_{17}$ represents a hydrogen atom, an aliphatic or aromatic hydrocarbon residue, or a heterocyclic group, $R_{13}$, $R_{14}$ and $R_{15}$ each may represent a divalent group, and any two of them combine with each other to complete a ring structure. Specific examples of the group represented by formula (T-2) are illustrated below.

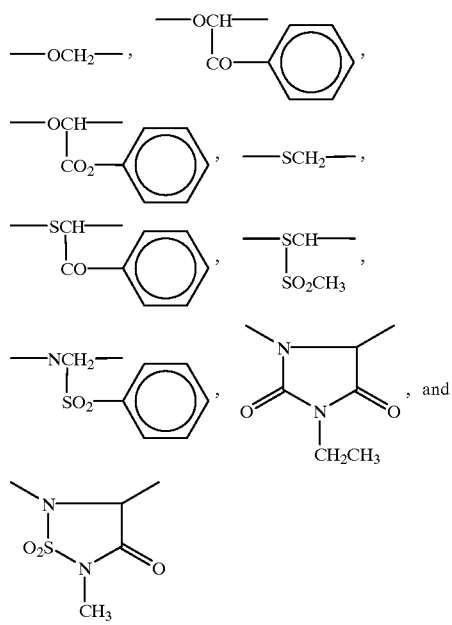

T-3

-Nu1-LINK4-E1- wherein Nu1 represents a nucleophilic group, and an oxygen or sulfur atom can be given as an example of nucleophilic species; E1 represents an electrophilic group being a group which is subjected to nucleophilic attack by Nu1; and LINK4 represents a linking group which enables Nu1 and E1 to have a steric arrangement such that an intramolecular nucleophilic substitution reaction can occur. Specific examples of the group represented by formula (T-3) are illustrated below.

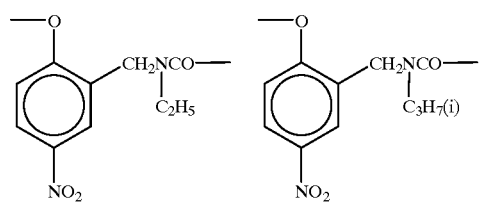

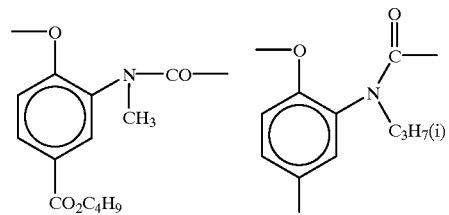

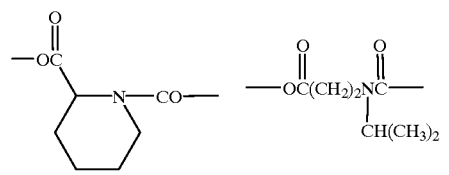

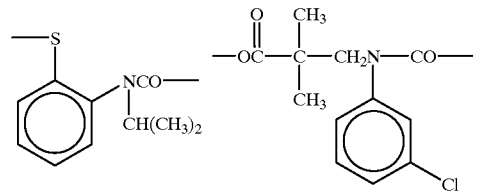

T-4

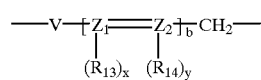

wherein V, $R_{13}$, $R_{14}$ and b all have the same meaning as in formula (T-2), respectively. In addition, $R_{13}$ and $R_{14}$ may be joined together to form a benzene ring or a heterocyclic ring, or V may be joined with $R_{13}$ or $R_{14}$ to form a benzene or heterocyclic ring. $Z_1$ and $Z_2$ each independently represents a carbon atom or a nitrogen atom, and x and y each represents 0 or 1.

Specific examples of the timing group (T-4) are illustrated below.

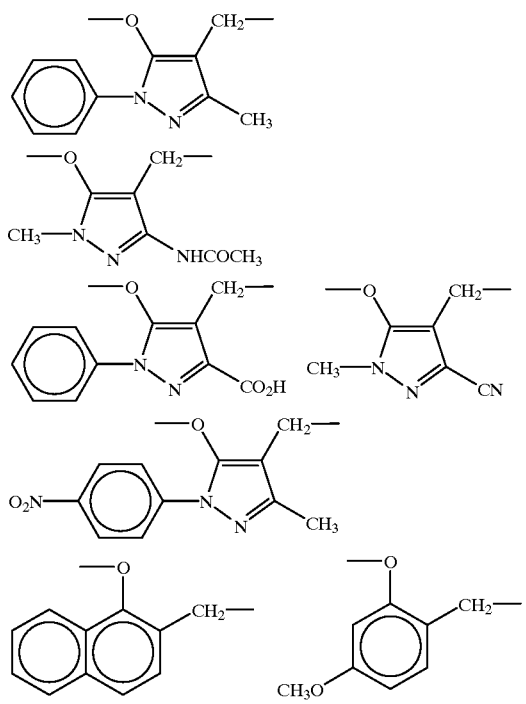

-continued

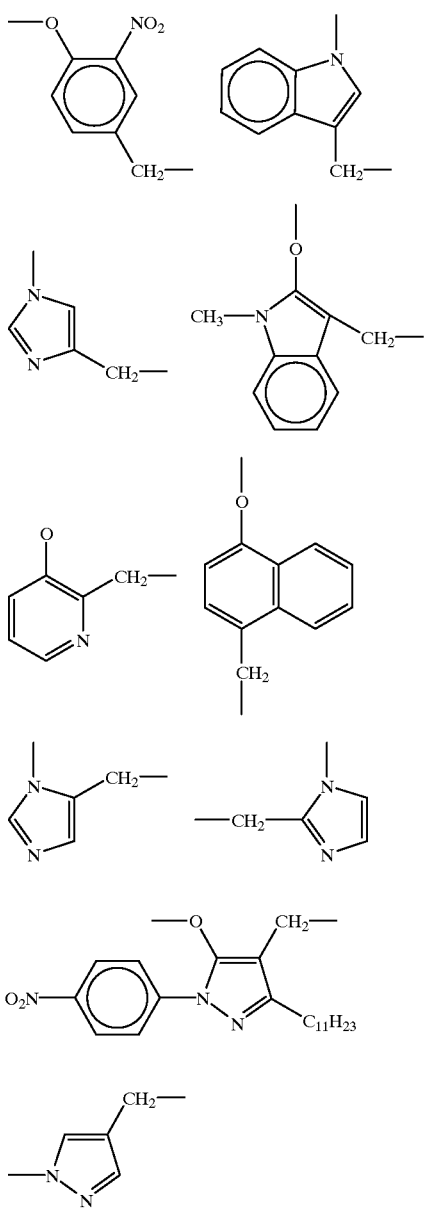

In one embodiment of the present invention, the compound according to the present invention is a blocked developer having the following Structure V:

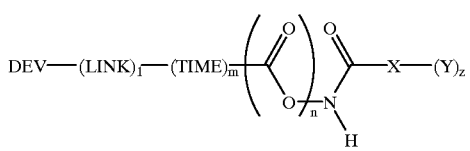

wherein DEV is a developing agent and the other groups are as defined above. Particularly preferred blocked developing agents are represented by Structure VI:

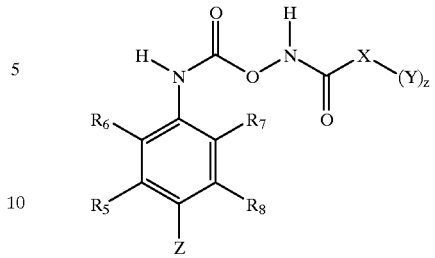

wherein:
Z is OH or $NR_2R_3$, where $R_2$ and $R_3$ are independently hydrogen or a substituted or unsubstituted alkyl group or $R_2$ and $R_3$ are connected to form a ring;
$R_5$, $R_6$, $R_7$, and $R_8$ are independently hydrogen, halogen, hydroxy, amino, alkoxy, carbonamido, sulfonamido, alkylsulfonamido or alkyl, or $R_5$ can connect with $R_3$ or $R_6$ and/or $R_8$ can connect to $R_2$ or $R_7$ to form a ring;
X is carbon atom, aryl group or heteroaromatic group;
Y is an independently selected substituent, electron donating or electron withdrawing, and z is 0 to 7; additionally two substituents Y can join to form a ring.

The following are representative examples of photographically useful compounds for use in the invention:

Structure

D-1

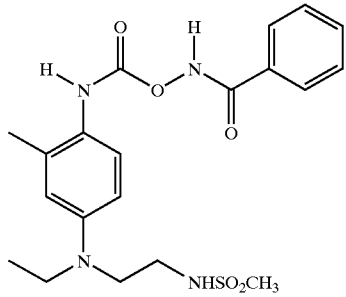

D-2

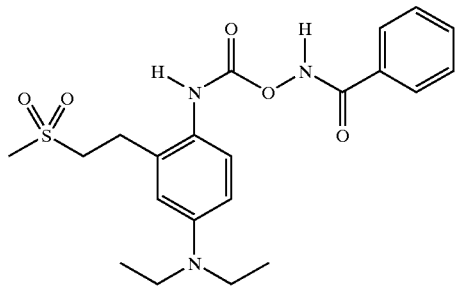

D-3

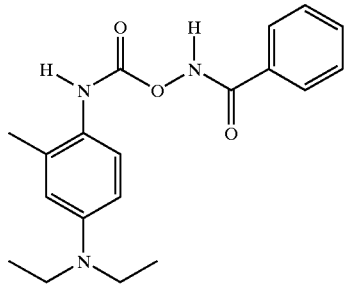

-continued
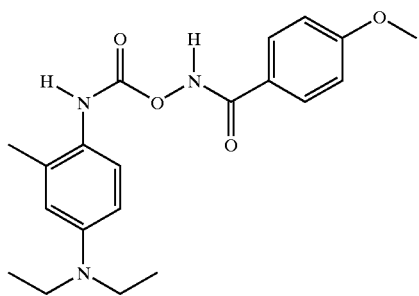
D-4
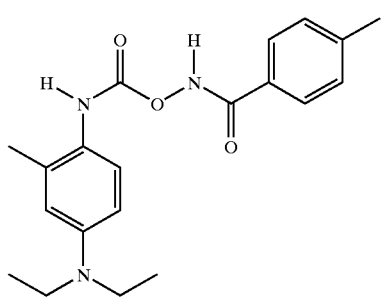
D-5
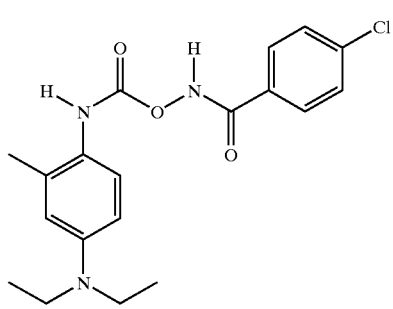
D-6
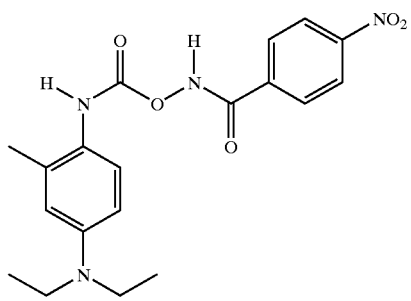
D-7
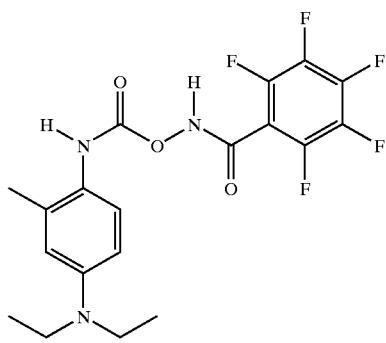
D-8
-continued
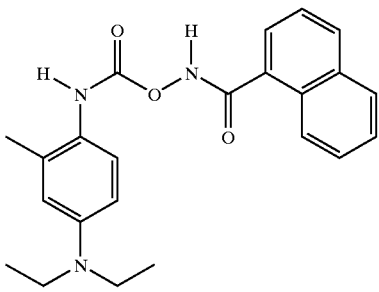
D-9
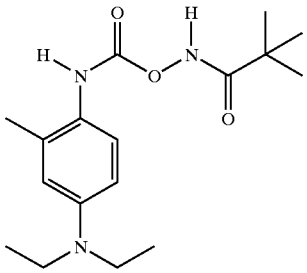
D-10
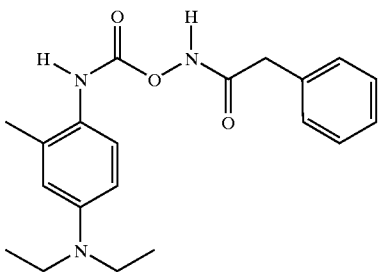
D-11
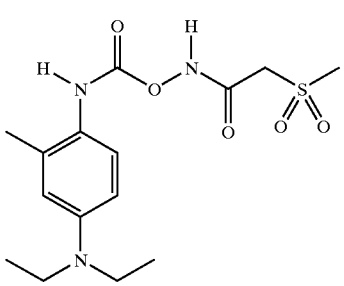
D-12
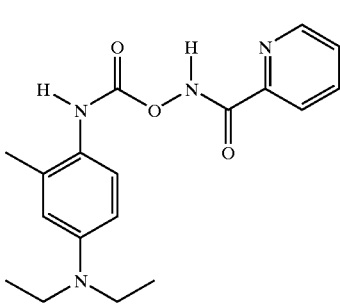
D-13

D-14
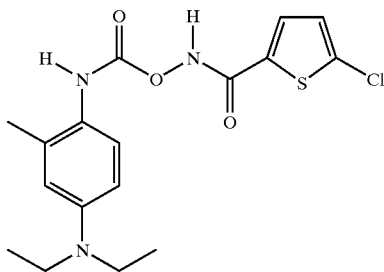

D-15
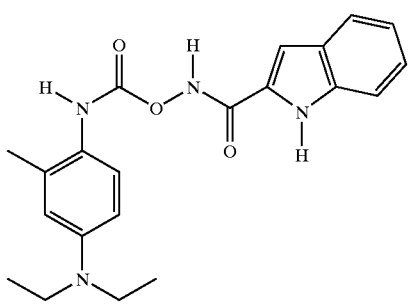

D-16
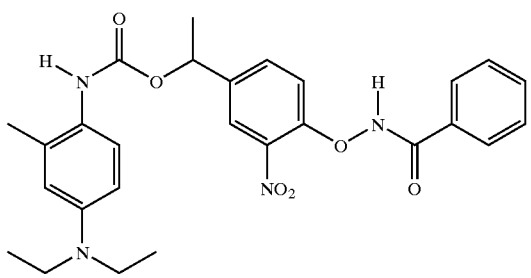

D-17
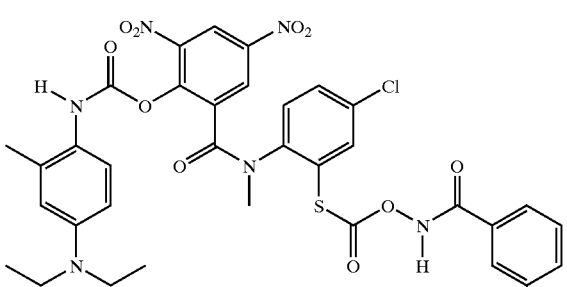

D-18
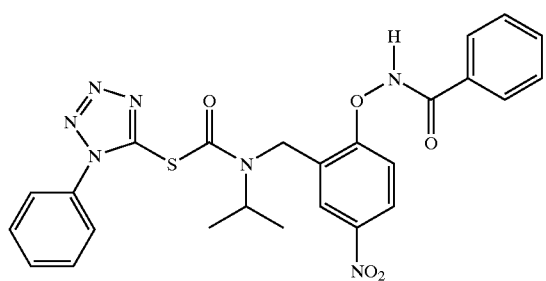

D-19
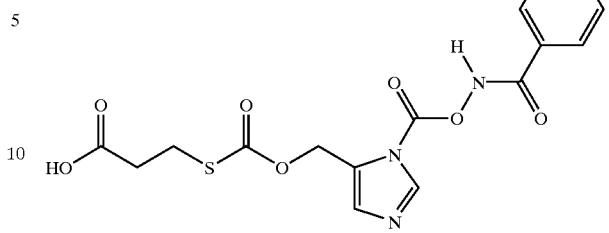

The blocked developer is preferably incorporated in one or more of the imaging layers of the imaging element. The amount of blocked developer used is preferably 0.01 to 5 g/m$^2$, more preferably 0.1 to 2 g/m$^2$ and most preferably 0.3 to 2 g/m$^2$ in each layer to which it is added. These may be color forming or non-color forming layers of the element. The blocked developer can be contained in a separate element that is contacted to the photographic element during processing.

In the case of photothermographic imaging elements, after image-wise exposure of the imaging element, the blocked developer is activated during processing of the imaging element by the presence of acid or base in the processing solution, by heating the imaging element during processing of the imaging element, and/or by placing the imaging element in contact with a separate element, such as a laminate sheet, during processing. The laminate sheet optionally contains additional processing chemicals such as those disclosed in Sections XIX and XX of *Research Disclosure,* September 1996, Number 389, Item 38957 (hereafter referred to as ("*Research Disclosure* I "). All sections referred to herein are sections of *Research Disclosure* I, unless otherwise indicated. Such chemicals include, for example, sulfites, hydroxyl amine, hydroxamic acids and the like, antifoggants, such as alkali metal halides, nitrogen containing heterocyclic compounds, and the like, sequestering agents such as an organic acids, and other additives such as buffering agents, sulfonated polystyrene, stain reducing agents, biocides, desilvering agents, stabilizers and the like.

The blocked compounds may be used in any form of photographic system. A typical color negative film construction useful in the practice of the invention is illustrated by the following element, SCN-1:

| | Element SCN-1 |
|---|---|
| SOC | Surface Overcoat |
| BU | Blue Recording Layer Unit |
| IL1 | First Interlayer |
| GU | Green Recording Layer Unit |
| IL2 | Second Interlayer |
| RU | Red Recording Layer Unit |
| AHU | Antihalation Layer Unit |
| S | Support |
| SOC | Surface Overcoat |

The support S can be either reflective or transparent, which is usually preferred. When reflective, the support is white and can take the form of any conventional support currently employed in color print elements. When the support is transparent, it can be colorless or tinted and can take the form of any conventional support currently employed in color negative elements-e.g., a colorless or tinted transparent film support. Details of support construction are well understood in the art. Examples of useful supports are poly(vinylacetal) film, polystyrene film, poly(ethyleneterephthalate) film, poly(ethylene naphthalate) film, polycarbonate film, and related films and resinous materials, as well as paper, cloth, glass, metal, and other supports that withstand the anticipated processing conditions. The element can contain additional layers, such as filter layers, interlayers, overcoat layers, subbing layers, antihalation layers and the like. Transparent and reflective support constructions, including subbing layers to enhance adhesion, are disclosed in Section XV of *Research Disclosure* I.

Photographic elements of the present invention may also usefully include a magnetic recording material as described in *Research Disclosure*, Item 34390, November 1992, or a transparent magnetic recording layer such as a layer containing magnetic particles on the underside of a transparent support as in U.S. Pat. No. 4,279,945, and U.S. Pat. No. 4,302,523.

Each of blue, green and red recording layer units BU, GU and RU are formed of one or more hydrophilic colloid layers and contain at least one radiation-sensitive silver halide emulsion and coupler, including at least one dye image-forming coupler. It is preferred that the green, and red recording units are subdivided into at least two recording layer sub-units to provide increased recording latitude and reduced image granularity. In the simplest contemplated construction each of the layer units or layer sub-units consists of a single hydrophilic colloid layer containing emulsion and coupler. When coupler present in a layer unit or layer sub-unit is coated in a hydrophilic colloid layer other than an emulsion containing layer, the coupler containing hydrophilic colloid layer is positioned to receive oxidized color developing agent from the emulsion during development. Usually the coupler containing layer is the next adjacent hydrophilic colloid layer to the emulsion containing layer.

In order to ensure excellent image sharpness, and to facilitate manufacture and use in cameras, all of the sensitized layers are preferably positioned on a common face of the support. When in spool form, the element will be spooled such that when unspooled in a camera, exposing light strikes all of the sensitized layers before striking the face of the support carrying these layers. Further, to ensure excellent sharpness of images exposed onto the element, the total thickness of the layer units above the support should be controlled. Generally, the total thickness of the sensitized layers, interlayers and protective layers on the exposure face of the support are less than 35 $\mu$m.

Any convenient selection from among conventional radiation-sensitive silver halide emulsions can be incorporated within the layer units and used to provide the spectral absorptances of the invention. Most commonly high bromide emulsions containing a minor amount of iodide are employed. To realize higher rates of processing, high chloride emulsions can be employed. Radiation-sensitive silver chloride, silver bromide, silver iodobromide, silver iodochloride, silver chlorobromide, silver bromochloride, silver iodochlorobromide and silver iodobromochloride grains are all contemplated. The grains can be either regular or irregular (e.g., tabular). Tabular grain emulsions, those in which tabular grains account for at least 50 (preferably at least 70 and optimally at least 90) percent of total grain projected area are particularly advantageous for increasing speed in relation to granularity. To be considered tabular a grain requires two major parallel faces with a ratio of its equivalent circular diameter (ECD) to its thickness of at least 2. Specifically preferred tabular grain emulsions are those having a tabular grain average aspect ratio of at least 5 and, optimally, greater than 8. Preferred mean tabular grain thicknesses are less than 0.3 $\mu$m (most preferably less than 0.2 $\mu$m). Ultrathin tabular grain emulsions, those with mean tabular grain thicknesses of less than 0.07 $\mu$m, are specifically contemplated. The grains preferably form surface latent images so that they produce negative images when processed in a surface developer in color negative film forms of the invention.

Illustrations of conventional radiation-sensitive silver halide emulsions are provided by *Research Disclosure* I, cited above, I. Emulsion grains and their preparation. Chemical sensitization of the emulsions, which can take any conventional form, is illustrated in section IV. Chemical sensitization. Compounds useful as chemical sensitizers, include, for example, active gelatin, sulfur, selenium, tellurium, gold, platinum, palladium, iridium, osmium, rhenium, phosphorous, or combinations thereof. Chemical sensitization is generally carried out at pAg levels of from 5 to 10, pH levels of from 4 to 8, and temperatures of from 30 to 80° C. Spectral sensitization and sensitizing dyes, which can take any conventional form, are illustrated by section V. Spectral sensitization and desensitization. The dye may be added to an emulsion of the silver halide grains and a hydrophilic colloid at any time prior to (e.g., during or after chemical sensitization) or simultaneous with the coating of the emulsion on a photographic element. The dyes may, for example, be added as a solution in water or an alcohol or as a dispersion of solid particles. The emulsion layers also typically include one or more antifoggants or stabilizers, which can take any conventional form, as illustrated by section VII. Antifoggants and stabilizers.

The silver halide grains to be used in the invention may be prepared according to methods known in the art, such as those described in *Research Disclosure* I, cited above, and James, The Theory of the Photographic Process. These include methods such as ammoniacal emulsion making, neutral or acidic emulsion making, and others known in the art. These methods generally involve mixing a water soluble silver salt with a water soluble halide salt in the presence of a protective colloid, and controlling the temperature, pAg, pH values, etc, at suitable values during formation of the silver halide by precipitation.

In the course of grain precipitation one or more dopants (grain occlusions other than silver and halide) can be introduced to modify grain properties. For example, any of the various conventional dopants disclosed in *Research Disclosure* I, Section I. Emulsion grains and their preparation, sub-section G. Grain modifying conditions and adjustments, paragraphs (3), (4) and (5), can be present in the emulsions of the invention. In addition it is specifically contemplated to dope the grains with transition metal hexacoordination complexes containing one or more organic ligands, as taught by Olm et al U.S. Pat. No. 5,360,712, the disclosure of which is here incorporated by reference.

It is specifically contemplated to incorporate in the face centered cubic crystal lattice of the grains a dopant capable of increasing imaging speed by forming a shallow electron trap (hereinafter also referred to as a SET) as discussed in *Research Disclosure* Item 36736 published November 1994, here incorporated by reference.

The photographic elements of the present invention, as is typical, provide the silver halide in the form of an emulsion.

Photographic emulsions generally include a vehicle for coating the emulsion as a layer of a photographic element. Useful vehicles include both naturally occurring substances such as proteins, protein derivatives, cellulose derivatives (e.g., cellulose esters), gelatin (e.g., alkali-treated gelatin such as cattle bone or hide gelatin, or acid treated gelatin such as pigskin gelatin), deionized gelatin, gelatin derivatives (e.g., acetylated gelatin, phthalated gelatin, and the like), and others as described in *Research Disclosure*, I. Also useful as vehicles or vehicle extenders are hydrophilic water-permeable colloids. These include synthetic polymeric peptizers, carriers, and/or binders such as poly(vinyl alcohol), poly(vinyl lactams), acrylamide polymers, polyvinyl acetals, polymers of alkyl and sulfoalkyl acrylates and methacrylates, hydrolyzed polyvinyl acetates, polyamides, polyvinyl pyridine, methacrylamide copolymers. The vehicle can be present in the emulsion in any amount useful in photographic emulsions. The emulsion can also include any of the addenda known to be useful in photographic emulsions.

While any useful quantity of light sensitive silver, as silver halide, can be employed in the elements useful in this invention, it is preferred that the total quantity be less than 10 g/m$^2$ of silver. Silver quantities of less than 7 g/m$^2$ are preferred, and silver quantities of less than 5 g/m$^2$ are even more preferred. The lower quantities of silver improve the optics of the elements, thus enabling the production of sharper pictures using the elements. These lower quantities of silver are additionally important in that they enable rapid development and desilvering of the elements. Conversely, a silver coating coverage of at least 1.5 g of coated silver per m$^2$ of support surface area in the element is necessary to realize an exposure latitude of at least 2.7 log E while maintaining an adequately low graininess position for pictures intended to be enlarged.

BU contains at least one yellow dye image-forming coupler, GU contains at least one magenta dye image-forming coupler, and RU contains at least one cyan dye image-forming coupler. Any convenient combination of conventional dye image-forming couplers can be employed. Conventional dye image-forming couplers are illustrated by *Research Disclosure* I, cited above, X. Dye image formers and modifiers, B. Image-dye-forming couplers. The photographic elements may further contain other image-modifying compounds such as "Development Inhibitor-Releasing" compounds (DIR's). Useful additional DIR's for elements of the present invention, are known in the art and examples are described in U.S. Pat. Nos. 3,137,578; 3,148,022; 3,148,062; 3,227,554; 3,384,657; 3,379,529; 3,615,506; 3,617,291; 3,620,746; 3,701,783; 3,733,201; 4,049,455; 4,095,984; 4,126,459; 4,149,886; 4,150,228; 4,211,562; 4,248,962; 4,259,437; 4,362,878; 4,409,323; 4,477,563; 4,782,012; 4,962,018; 4,500,634; 4,579,816; 4,607,004; 4,618,571; 4,678,739; 4,746,600; 4,746,601; 4,791,049; 4,857,447; 4,865,959; 4,880,342; 4,886,736; 4,937,179; 4,946,767; 4,948,716; 4,952,485; 4,956,269; 4,959,299; 4,966,835; 4,985,336 as well as in patent publications GB 1,560,240; GB 2,007,662; GB 2,032,914; GB 2,099,167; DE 2,842,063, DE 2,937,127; DE 3,636,824; DE 3,644,416 as well as the following European Patent Publications: 272,573; 335,319; 336,411; 346,899; 362,870; 365,252; 365,346; 373,382; 376,212; 377,463; 378,236; 384,670; 396,486; 401,612; 401,613.

DIR compounds are also disclosed in "Developer-Inhibitor-Releasing (DIR) Couplers for Color Photography," C. R. Barr, J. R. Thirtle and P. W. Vittum in *Photographic Science and Engineering*, Vol. 13, p. 174 (1969), incorporated herein by reference.

It is common practice to coat one, two or three separate emulsion layers within a single dye image-forming layer unit. When two or more emulsion layers are coated in a single layer unit, they are typically chosen to differ in sensitivity. When a more sensitive emulsion is coated over a less sensitive emulsion, a higher speed is realized than when the two emulsions are blended. When a less sensitive emulsion is coated over a more sensitive emulsion, a higher contrast is realized than when the two emulsions are blended. It is preferred that the most sensitive emulsion be located nearest the source of exposing radiation and the slowest emulsion be located nearest the support.

One or more of the layer units of the invention is preferably subdivided into at least two, and more preferably three or more sub-unit layers. It is preferred that all light sensitive silver halide emulsions in the color recording unit have spectral sensitivity in the same region of the visible spectrum. In this embodiment, while all silver halide emulsions incorporated in the unit have spectral absorptance according to invention, it is expected that there are minor differences in spectral absorptance properties between them. In still more preferred embodiments, the sensitizations of the slower silver halide emulsions are specifically tailored to account for the light shielding effects of the faster silver halide emulsions of the layer unit that reside above them, in order to provide an imagewise uniform spectral response by the photographic recording material as exposure varies with low to high light levels. Thus higher proportions of peak light absorbing spectral sensitizing dyes may be desirable in the slower emulsions of the subdivided layer unit to account for on-peak shielding and broadening of the underlying layer spectral sensitivity.

The interlayers IL1 and IL2 are hydrophilic colloid layers having as their primary function color contamination reduction—i.e., prevention of oxidized developing agent from migrating to an adjacent recording layer unit before reacting with dye-forming coupler. The interlayers are in part effective simply by increasing the diffusion path length that oxidized developing agent must travel. To increase the effectiveness of the interlayers to intercept oxidized developing agent, it is conventional practice to incorporate oxidized developing agent. Antistain agents (oxidized developing agent scavengers) can be selected from among those disclosed by *Research Disclosure* I, X. Dye image formers and modifiers, D. Hue modifiers/stabilization, paragraph (2). When one or more silver halide emulsions in GU and RU are high bromide emulsions and, hence have significant native sensitivity to blue light, it is preferred to incorporate a yellow filter, such as Carey Lea silver or a yellow processing solution decolorizable dye, in IL1. Suitable yellow filter dyes can be selected from among those illustrated by *Research Disclosure* I, Section VIII. Absorbing and scattering materials, B. Absorbing materials. In elements of the instant invention, magenta colored filter materials are absent from IL2 and RU.

The antihalation layer unit AHU typically contains a processing solution removable or decolorizable light absorbing material, such as one or a combination of pigments and dyes. Suitable materials can be selected from among those disclosed in *Research Disclosure* I, Section VIII. Absorbing materials. A common alternative location for AHU is between the support S and the recording layer unit coated nearest the support.

The surface overcoats SOC are hydrophilic colloid layers that are provided for physical protection of the color negative elements during handling and processing. Each SOC also provides a convenient location for incorporation of addenda that are most effective at or near the surface of the color negative element. In some instances the surface overcoat is divided into a surface layer and an interlayer, the latter functioning as spacer between the addenda in the surface layer and the adjacent recording layer unit. In another common variant form, addenda are distributed between the surface layer and the interlayer, with the latter containing addenda that are compatible with the adjacent recording layer unit. Most typically the SOC contains addenda, such as coating aids, plasticizers and lubricants, antistats and matting agents, such as illustrated by *Research Disclosure* I, Section IX. Coating physical property modifying addenda. The SOC overlying the emulsion layers additionally preferably contains an ultraviolet absorber, such as illustrated by *Research Disclosure* I, Section VI. UV dyes/optical brighteners/luminescent dyes, paragraph (1).

Instead of the layer unit sequence of element SCN-1, alternative layer units sequences can be employed and are particularly attractive for some emulsion choices. Using high chloride emulsions and/or thin (<0.2 μm mean grain thickness) tabular grain emulsions all possible interchanges of the positions of BU, GU and RU can be undertaken without risk of blue light contamination of the minus blue records, since these emulsions exhibit negligible native sensitivity in the visible spectrum. For the same reason, it is unnecessary to incorporate blue light absorbers in the interlayers.

When the emulsion layers within a dye image-forming layer unit differ in speed, it is conventional practice to limit the incorporation of dye image-forming coupler in the layer of highest speed to less than a stoichiometric amount, based on silver. The function of the highest speed emulsion layer is to create the portion of the characteristic curve just above the minimum density—i.e., in an exposure region that is below the threshold sensitivity of the remaining emulsion layer or layers in the layer unit. In this way, adding the increased granularity of the highest sensitivity speed emulsion layer to the dye image record produced is minimized without sacrificing imaging speed.

In the foregoing discussion the blue, green and red recording layer units are described as containing yellow, magenta and cyan image dye-forming couplers, respectively, as is conventional practice in color negative elements used for printing. The invention can be suitably applied to conventional color negative construction as illustrated. Color reversal film construction would take a similar form, with the exception that colored masking couplers would be completely absent; in typical forms, development inhibitor releasing couplers would also be absent. In preferred embodiments, the color negative elements are intended exclusively for scanning to produce three separate electronic color records. Thus the actual hue of the image dye produced is of no importance. What is essential is merely that the dye image produced in each of the layer units be differentiable from that produced by each of the remaining layer units. To provide this capability of differentiation it is contemplated that each of the layer units contain one or more dye image-forming couplers chosen to produce image dye having an absorption half-peak bandwidth lying in a different spectral region. It is immaterial whether the blue, green or red recording layer unit forms a yellow, magenta or cyan dye having an absorption half peak bandwidth in the blue, green or red region of the spectrum, as is conventional in a color negative element intended for use in printing, or an absorption half-peak bandwidth in any other convenient region of the spectrum, ranging from the near ultraviolet (300–400 nm) through the visible and through the near infrared (700–1200 nm), so long as the absorption half-peak bandwidths of the image dye in the layer units extend over substantially non-coextensive wavelength ranges. The term "substantially non-coextensive wavelength ranges" means that each image dye exhibits an absorption half-peak band width that extends over at least a 25 (preferably 50) nm spectral region that is not occupied by an absorption half-peak band width of another image dye. Ideally the image dyes exhibit absorption half-peak band widths that are mutually exclusive.

When a layer unit contains two or more emulsion layers differing in speed, it is possible to lower image granularity in the image to be viewed, recreated from an electronic record, by forming in each emulsion layer of the layer unit a dye image which exhibits an absorption half-peak band width that lies in a different spectral region than the dye images of the other emulsion layers of layer unit. This technique is particularly well suited to elements in which the layer units are divided into sub-units that differ in speed. This allows multiple electronic records to be created for each layer unit, corresponding to the differing dye images formed by the emulsion layers of the same spectral sensitivity. The digital record formed by scanning the dye image formed by an emulsion layer of the highest speed is used to recreate the portion of the dye image to be viewed lying just above minimum density. At higher exposure levels second and, optionally, third electronic records can be formed by scanning spectrally differentiated dye images formed by the remaining emulsion layer or layers. These digital records contain less noise (lower granularity) and can be used in recreating the image to be viewed over exposure ranges above the threshold exposure level of the slower emulsion layers. This technique for lowering granularity is disclosed in greater detail by Sutton U.S. Pat. No. 5,314,794, the disclosure of which is here incorporated by reference.

Each layer unit of the color negative elements of the invention produces a dye image characteristic curve gamma of less than 1.5, which facilitates obtaining an exposure latitude of at least 2.7 log E. A minimum acceptable exposure latitude of a multicolor photographic element is that which allows accurately recording the most extreme whites (e.g., a bride's wedding gown) and the most extreme blacks (e.g., a bride groom's tuxedo) that are likely to arise in photographic use. An exposure latitude of 2.6 log E can just accommodate the typical bride and groom wedding scene. An exposure latitude of at least 3.0 log E is preferred, since this allows for a comfortable margin of error in exposure level selection by a photographer. Even larger exposure latitudes are specifically preferred, since the ability to obtain accurate image reproduction with larger exposure errors is realized. Whereas in color negative elements intended for printing, the visual attractiveness of the printed scene is often lost when gamma is exceptionally low, when color negative elements are scanned to create digital dye image records, contrast can be increased by adjustment of the electronic signal information. When the elements of the invention are scanned using a reflected beam, the beam travels through the layer units twice. This effectively doubles gamma ($\Delta D \div \Delta \log E$) by doubling changes in density ($\Delta D$). Thus, gamma's as low as 1.0 or even 0.6 are contemplated and exposure latitudes of up to about 5.0 log E or higher are feasible. Gammas of about 0.55 are preferred. Gammas of between about 0.4 and 0.5 are especially preferred.

Instead of employing dye-forming couplers, any of the conventional incorporated dye image generating compounds employed in multicolor imaging can be alternatively incorporated in the blue, green and red recording layer units. Dye images can be produced by the selective destruction, formation or physical removal of dyes as a function of exposure. For example, silver dye bleach processes are well known and commercially utilized for forming dye images by the selective destruction of incorporated image dyes. The silver dye bleach process is illustrated by *Research Disclosure* I, Section X. Dye image formers and modifiers, A. Silver dye bleach.

It is also well known that pre-formed image dyes can be incorporated in blue, green and red recording layer units, the dyes being chosen to be initially immobile, but capable of releasing the dye chromophore in a mobile moiety as a function of entering into a redox reaction with oxidized developing agent. These compounds are commonly referred to as redox dye releasers (RDR's). By washing out the released mobile dyes, a retained dye image is created that can be scanned. It is also possible to transfer the released mobile dyes to a receiver, where they are immobilized in a mordant layer. The image-bearing receiver can then be scanned. Initially the receiver is an integral part of the color negative element. When scanning is conducted with the receiver remaining an integral part of the element, the receiver typically contains a transparent support, the dye image bearing mordant layer just beneath the support, and a white reflective layer just beneath the mordant layer. Where the receiver is peeled from the color negative element to facilitate scanning of the dye image, the receiver support can be reflective, as is commonly the choice when the dye image is intended to be viewed, or transparent, which allows transmission scanning of the dye image. RDR's as well as dye image transfer systems in which they are incorporated are described in *Research Disclosure,* Vol. 151, November 1976, Item 15162.

It is also recognized that the dye image can be provided by compounds that are initially mobile, but are rendered immobile during imagewise development. Image transfer systems utilizing imaging dyes of this type have long been used in previously disclosed dye image transfer systems. These and other image transfer systems compatible with the practice of the invention are disclosed in *Research Disclosure,* Vol. 176, December 1978, Item 17643, XXIII. Image transfer systems.

A number of modifications of color negative elements have been suggested for accommodating scanning, as illustrated by *Research Disclosure* I, Section XIV. Scan facilitating features. These systems to the extent compatible with the color negative element constructions described above are contemplated for use in the practice of this invention.

It is also contemplated that the imaging element of this invention may be used with non-conventional sensitization schemes. For example, instead of using imaging layers sensitized to the red, green, and blue regions of the spectrum, the light-sensitive material may have one white-sensitive layer to record scene luminance, and two color-sensitive layers to record scene chrominance. Following development, the resulting image can be scanned and digitally reprocessed to reconstruct the full colors of the original scene as described in U.S. Pat. No. 5,962,205. The imaging element may also comprise a pan-sensitized emulsion with accompanying color-separation exposure. In this embodiment, the developers of the invention would give rise to a colored or neutral image which, in conjunction with the separation exposure, would enable full recovery of the original scene color values. In such an element, the image may be formed by either developed silver density, a combination of one or more conventional couplers, or "black" couplers such as resorcinol couplers. The separation exposure may be made either sequentially through appropriate filters, or simultaneously through a system of spatially discreet filter elements (commonly called a "color filter array").

The imaging element of the invention may also be a black and white image-forming material comprised, for example, of a pan-sensitized silver halide emulsion and a developer of the invention. In this embodiment, the image may be formed by developed silver density following processing, or by a coupler that generates a dye which can be used to carry the neutral image tone scale.

When conventional yellow, magenta, and cyan image dyes are formed to read out the recorded scene exposures following chemical development of conventional exposed color photographic materials, the response of the red, green, and blue color recording units of the element can be accurately discerned by examining their densities. Densitometry is the measurement of transmitted light by a sample using selected colored filters to separate the imagewise response of the RGB image dye forming units into relatively independent channels. It is common to use Status M filters to gauge the response of color negative film elements intended for optical printing, and Status A filters for color reversal films intended for direct transmission viewing. In integral densitometry, the unwanted side and tail absorptions of the imperfect image dyes leads to a small amount of channel mixing, where part of the total response of, for example, a magenta channel may come from off-peak absorptions of either the yellow or cyan image dyes records, or both, in neutral characteristic curves. Such artifacts may be negligible in the measurement of a film's spectral sensitivity. By appropriate mathematical treatment of the integral density response, these unwanted off-peak density contributions can be completely corrected providing analytical densities, where the response of a given color record is independent of the spectral contributions of the other image dyes. Analytical density determination has been summarized in the *SPSE Handbook of Photographic Science and Engineering,* W. Thomas, editor, John Wiley and Sons, New York, 1973, Section 15.3, Color Densitometry, pp. 840–848.

Image noise can be reduced, where the images are obtained by scanning exposed and processed color negative film elements to obtain a manipulatable electronic record of the image pattern, followed by reconversion of the adjusted electronic record to a viewable form. Image sharpness and colorfulness can be increased by designing layer gamma ratios to be within a narrow range while avoiding or minimizing other performance deficiencies, where the color record is placed in an electronic form prior to recreating a color image to be viewed. Whereas it is impossible to separate image noise from the remainder of the image information, either in printing or by manipulating an electronic image record, it is possible by adjusting an electronic image record that exhibits low noise, as is provided by color negative film elements with low gamma ratios, to improve overall curve shape and sharpness characteristics in a manner that is impossible to achieve by known printing techniques. Thus, images can be recreated from electronic image records derived from such color negative elements that are superior to those similarly derived from conventional color negative elements constructed to serve optical printing applications. The excellent imaging characteristics of the described element are obtained when the gamma ratio for each of the red, green and blue color recording units is less than 1.2. In a more preferred embodiment, the red, green, and blue light sensitive color forming units each exhibit gamma ratios of less than 1.15. In an even more preferred embodiment, the red and blue light sensitive color forming units each exhibit gamma ratios of less than 1.10. In a most preferred embodiment, the red, green, and blue light sensitive color forming units each exhibit gamma ratios of less than 1.10. In all cases, it is preferred that the individual color unit(s) exhibit gamma ratios of less than 1.15, more preferred that they exhibit gamma ratios of less than 1.10 and even more preferred that they exhibit gamma ratios of less than 1.05. The gamma ratios of the layer units need not be equal. These low values of the gamma ratio are indicative of low levels of interlayer interaction, also known as interlayer interimage effects, between the layer units and are believed to account for the improved quality of the images after scanning and electronic manipulation. The apparently deleterious image characteristics that result from chemical interactions between the layer units need not be electronically suppressed during the image manipulation activity. The interactions are often difficult if not impossible to suppress properly using known electronic image manipulation schemes.

Elements having excellent light sensitivity are best employed in the practice of this invention. The elements should have a sensitivity of at least about ISO 50, preferably have a sensitivity of at least about ISO 100, and more preferably have a sensitivity of at least about ISO 200. Elements having a sensitivity of up to ISO 3200 or even higher are specifically contemplated. The speed, or sensitivity, of a color negative photographic element is inversely related to the exposure required to enable the attainment of a specified density above fog after processing. Photographic speed for a color negative element with a gamma of about 0.65 in each color record has been specifically defined by the American National Standards Institute (ANSI) as ANSI Standard Number PH 2.27–1981 (ISO (ASA Speed)) and relates specifically the average of exposure levels required to produce a density of 0.15 above the minimum density in each of the green light sensitive and least sensitive color recording unit of a color film. This definition conforms to the International Standards Organization (ISO) film speed rating. For the purposes of this application, if the color unit gammas differ from 0.65, the ASA or ISO speed is to be calculated by linearly amplifying or deamplifying the gamma vs. log E (exposure) curve to a value of 0.65 before determining the speed in the otherwise defined manner.

The present invention also contemplates the use of photographic elements of the present invention in what are often referred to as single use cameras (or "film with lens" units). These cameras are sold with film preloaded in them and the entire camera is returned to a processor with the exposed film remaining inside the camera The one-time-use cameras employed in this invention can be any of those known in the art. These cameras can provide specific features as known in the art such as shutter means, film winding means, film advance means, waterproof housings, single or multiple lenses, lens selection means, variable aperture, focus or focal length lenses, means for monitoring lighting conditions, means for adjusting shutter times or lens characteristics based on lighting conditions or user provided instructions, and means for camera recording use conditions directly on the film. These features include, but are not limited to: providing simplified mechanisms for manually or automatically advancing film and resetting shutters as described at Skarman, U.S. Pat. No. 4,226,517; providing apparatus for automatic exposure control as described at Matterson et al, U.S. Pat. No. 4,345,835; moisture-proofing as described at Fujimura et al, U.S. Pat. No. 4,766,451; providing internal and external film casings as described at Ohmura et al, U.S. Pat. No. 4,751,536; providing means for recording use conditions on the film as described at Taniguchi et al, U.S. Pat. No. 4,780,735; providing lens fitted cameras as described at Arai, U.S. Pat. No. 4,804,987; providing film supports with superior anti-curl properties as described at Sasaki et al, U.S. Pat. No. 4,827,298; providing a viewfinder as described at Ohmura et al, U.S. Pat. No. 4,812,863; providing a lens of defined focal length and lens speed as described at Ushiro et al, U.S. Pat. No. 4,812,866; providing multiple film containers as described at Nakayama et al, U.S. Pat. No. 4,831,398 and at Ohmura et al, U.S. Pat. No. 4,833,495; providing films with improved anti-friction characteristics as described at Shiba, U.S. Pat. No. 4,866,469; providing winding mechanisms, rotating spools, or resilient sleeves as described at Mochida, U.S. Pat. No. 4,884,087; providing a film patrone or cartridge removable in an axial direction as described by Takei et al at U.S. Pat. Nos. 4,890,130 and 5,063,400; providing an electronic flash means as described at Ohmura et al, U.S. Pat. No. 4,896,178; providing an externally operable member for effecting exposure as described at Mochida et al, U.S. Pat. No. 4,954,857; providing film support with modified sprocket holes and means for advancing said film as described at Murakami, U.S. Pat. No. 5,049,908; providing internal mirrors as described at Hara, U.S. Pat. No. 5,084,719; and providing silver halide emulsions suitable for use on tightly wound spools as described at Yagi et al, European Patent Application 0,466,417 A.

While the film may be mounted in the one-time-use camera in any manner known in the art, it is especially preferred to mount the film in the one-time-use camera such that it is taken up on exposure by a thrust cartridge. Thrust cartridges are disclosed by Kataoka et al U.S. Pat. No. 5,226,613; by Zander U.S. Pat. No. 5,200,777; by Dowling et al U.S. Pat. No. 5,031,852; and by Robertson et al U.S. Pat. No. 4,834,306. Narrow bodied one-time-use cameras suitable for employing thrust cartridges in this way are described by Tobioka et al U.S. Pat. No. 5,692,221.

Cameras may contain a built-in processing capability, for example a heating element. Designs for such cameras including their use in an image capture and display system are disclosed in U.S. patent application Ser. No. 09/388,573 filed Sep. 1, 1999, incorporated herein by reference. The use of a one-time use camera as disclosed in said application is particularly preferred in the practice of this invention.

Photographic elements of the present invention are preferably imagewise exposed using any of the known techniques, including those described in *Research Disclosure* I, Section XVI. This typically involves exposure to light in the visible region of the spectrum, and typically such exposure is of a live image through a lens, although exposure can also be exposure to a stored image (such as a computer stored image) by means of light emitting devices (such as light emitting diodes, CRT and the like). The photothermographic elements are also exposed by means of various forms of energy, including ultraviolet and infrared regions of the electromagnetic spectrum as well as electron beam and beta radiation, gamma ray, x-ray, alpha particle, neutron radiation and other forms of corpuscular wave-like radiant energy in either non-coherent (random phase) or coherent (in phase) forms produced by lasers. Exposures are monochromatic, orthochromatic, or panchromatic depending upon the spectral sensitization of the photographic silver halide.

The elements as discussed above may serve as origination material for some or all of the following processes: image scanning to produce an electronic rendition of the capture image, and subsequent digital processing of that rendition to manipulate, store, transmit, output, or display electronically that image.

The blocked compounds of this invention may be used in photographic elements that contain any or all of the features discussed above, but are intended for different forms of processing. These types of systems will be described in detail below.

Type I: Thermal process systems (thermographic and photothermographic), where processing is initiated solely by the application of heat to the imaging element.

Type II: Low volume systems, where film processing is initiated by contact to a processing solution, but where the processing solution volume is comparable to the total volume of the imaging layer to be processed. This type of system may include the addition of non solution processing aids, such as the application of heat or of a laminate layer that is applied at the time of processing.

Type III: Conventional photographic systems, where film elements are processed by contact with conventional photographic processing solutions, and the volume of such solutions is very large in comparison to the volume of the imaging layer.

Types I, II and III will now be discussed.

Type I: Thermographic and Photothermographic Systems

In accordance with one aspect of this invention the blocked developer is incorporated in a photothermographic element. Photothermographic elements of the type described in *Research Disclosure* 17029 are included by reference. The photothermographic elements may be of type A or type B as disclosed in *Research Disclosure* I. Type A elements contain in reactive association a photosensitive silver halide, a reducing agent or developer, an activator, and a coating vehicle or binder. In these systems development occurs by reduction of silver ions in the photosensitive silver halide to metallic silver. Type B systems can contain all of the elements of a type A system in addition to a salt or complex of an organic compound with silver ion. In these systems, this organic complex is reduced during development to yield silver metal. The organic silver salt will be referred to as the silver donor. References describing such imaging elements include, for example, U.S. Pat. Nos. 3,457,075; 4,459,350; 4,264,725 and 4,741,992.

The photothermographic element comprises a photosensitive component that consists essentially of photographic silver halide. In the type B photothermographic material it is believed that the latent image silver from the silver halide acts as a catalyst for the described image-forming combination upon processing. In these systems, a preferred concentration of photographic silver halide is within the range of 0.01 to 100 moles of photographic silver halide per mole of silver donor in the photothermographic material.

The Type B photothermographic element comprises an oxidation-reduction image forming combination that contains an organic silver salt oxidizing agent. The organic silver salt is a silver salt which is comparatively stable to light, but aids in the formation of a silver image when heated to 80° C. or higher in the presence of an exposed photocatalyst (i.e., the photosensitive silver halide) and a reducing agent.

Suitable organic silver salts include silver salts of organic compounds having a carboxyl group. Preferred examples thereof include a silver salt of an aliphatic carboxylic acid and a silver salt of an aromatic carboxylic acid. Preferred examples of the silver salts of aliphatic carboxylic acids include silver behenate, silver stearate, silver oleate, silver laureate, silver caprate, silver myristate, silver palmitate, silver maleate, silver fumarate, silver tartarate, silver furoate, silver linoleate, silver butyrate and silver camphorate, mixtures thereof, etc. Silver salts which are substitutable with a halogen atom or a hydroxyl group can also be effectively used. Preferred examples of the silver salts of aromatic carboxylic acid and other carboxyl group-containing compounds include silver benzoate, a silver-substituted benzoate such as silver 3,5-dihydroxybenzoate, silver o-methylbenzoate, silver m-methylbenzoate, silver p-methylbenzoate, silver 2,4-dichlorobenzoate, silver acetamidobenzoate, silver p-phenylbenzoate, etc., silver gallate, silver tannate, silver phthalate, silver terephthalate, silver salicylate, silver phenylacetate, silver pyromellilate, a silver salt of 3-carboxymethyl-4-methyl-4-thiazoline-2-thione or the like as described in U.S. Pat. No. 3,785,830, and silver salt of an aliphatic carboxylic acid containing a thioether group as described in U.S. Pat. No. 3,330,663.

Silver salts of mercapto or thione substituted compounds having a heterocyclic nucleus containing 5 or 6 ring atoms, at least one of which is nitrogen, with other ring atoms including carbon and up to two hetero-atoms selected from among oxygen, sulfur and nitrogen are specifically contemplated. Typical preferred heterocyclic nuclei include triazole, oxazole, thiazole, thiazoline, imidazoline, imidazole, diazole, pyridine and triazine. Preferred examples of these heterocyclic compounds include a silver salt of 3-mercapto-4-phenyl-1,2,4 triazole, a silver salt of 2-mercaptobenzimidazole, a silver salt of 2-mercapto-5-aminothiadiazole, a silver salt of 2-(2-ethyl-glycolamido) benzothiazole, a silver salt of 5-carboxylic-1-methyl-2-phenyl-4-thiopyridine, a silver salt of mercaptotriazine, a silver salt of 2-mercaptobenzoxazole, a silver salt as described in U.S. Pat. No. 4,123,274, for example, a silver salt of 1,2,4-mercaptothiazole derivative such as a silver salt of 3-amino-5-benzylthio-1,2,4-thiazole, a silver salt of a thione compound such as a silver salt of 3-(2-carboxyethyl)-4-methyl-4-thiazoline-2-thione as disclosed in U.S. Pat. No. 3,201,678. Examples of other useful mercapto or thione substituted compounds that do not contain a heterocyclic nucleus are illustrated by the following: a silver salt of thioglycolic acid such as a silver salt of a S-alkylthioglycolic acid (wherein the alkyl group has from 12 to 22 carbon atoms) as described in Japanese patent application 28221/73, a silver salt of a dithiocarboxylic acid such as a silver salt of dithioacetic acid, and a silver salt of thioamide.

Furthermore, a silver salt of a compound containing an imino group can be used. Preferred examples of these compounds include a silver salt of benzotriazole and a derivative thereof as described in Japanese patent publications 30270/69 and 18146/70, for example a silver salt of benzotriazole or methylbenzotriazole, etc., a silver salt of a halogen substituted benzotriazole, such as a silver salt of 5-chlorobenzotriazole, etc., a silver salt of 1,2,4-triazole, a silver salt of 3-amino-5-mercaptobenzyl-1,2,4-triazole, of 1 H-tetrazole as described in U.S. Pat. No. 4,220,709, a silver salt of imidazole and an imidazole derivative, and the like.

It is also found convenient to use silver half soap, of which an equimolar blend of a silver behenate with behenic acid, prepared by precipitation from aqueous solution of the sodium salt of commercial behenic acid and analyzing about 14.5 percent silver, represents a preferred example. Transparent sheet materials made on transparent film backing require a transparent coating and for this purpose the silver behenate full soap, containing not more than about 4 or 5 percent of free behenic acid and analyzing about 25.2 percent silver may be used. A method for making silver soap dispersions is well known in the art and is disclosed in *Research Disclosure* October 1983 (23419) and U.S. Pat. No. 3,985,565.

Silver salts complexes may also be prepared by mixture of aqueous solutions of a silver ionic species, such as silver nitrate, and a solution of the organic ligand to be complexed with silver. The mixture process may take any convenient form, including those employed in the process of silver halide precipitation. A stabilizer may be used to avoid flocculation of the silver complex particles. The stabilizer may be any of those materials known to be useful in the photographic art, such as, but not limited to, gelatin, polyvinyl alcohol or polymeric or monomeric surfactants.

The photosensitive silver halide grains and the organic silver salt are coated so that they are in catalytic proximity during development. They can be coated in contiguous layers, but are preferably mixed prior to coating. Conventional mixing techniques are illustrated by *Research Disclosure,* Item 17029, cited above, as well as U.S. Pat. No. 3,700,458 and published Japanese patent applications Nos. 32928/75, 13224/74, 17216/75 and 42729/76.

A reducing agent in addition to the blocked developer may be included. The reducing agent for the organic silver salt may be any material, preferably organic material, that can reduce silver ion to metallic silver. Conventional photographic developers such as 3-pyrazolidinones, hydroquinones, p-aminophenols, p-phenylenediamines and catechol are useful, but hindered phenol reducing agents are preferred. The reducing agent is preferably present in a concentration ranging from 5 to 25 percent of the photothermographic layer.

A wide range of reducing agents has been disclosed in dry silver systems including amidoximes such as phenylamidoxime, 2-thienylamidoxime and p-phenoxyphenylamidoxime, azines (e.g., 4-hydroxy-3,5-dimethoxybenzaldehydeazine); a combination of aliphatic carboxylic acid aryl hydrazides and ascorbic acid, such as 2,2'-bis(hydroxymethyl)propionylbetaphenyl hydrazide in combination with ascorbic acid; an combination of polyhydroxybenzene and hydroxylamine, a reductone and/or a hydrazine, e.g., a combination of hydroquinone and bis (ethoxyethyl)hydroxylamine, piperidinohexose reductone or formyl-4-methylphenylhydrazine, hydroxamic acids such as phenylhydroxamic acid, p-hydroxyphenyl-hydroxamic acid, and o-alaninehydroxamic acid; a combination of azines and sulfonamidophenols, e.g., phenothiazine and 2,6-dichloro-4-benzenesulfonamidophenol; α-cyano-phenylacetic acid derivatives such as ethyl α-cyano-2-methylphenylacetate, ethyl α-cyano-phenylacetate; bis-β-naphthols as illustrated by 2,2'-dihydroxyl-1-binaphthyl, 6,6'-dibromo-2,2'-dihydroxy-1,1'-binaphthyl, and bis(2-hydroxy-1-naphthyl) methane; a combination of bis-o-naphthol and a 1,3-dihydroxybenzene derivative, (e. g., 2,4-dihydroxybenzophenone or 2,4-dihydroxyacetophenone); 5-pyrazolones such as 3-methyl-1-phenyl-5-pyrazolone; reductones as illustrated by dimethylaminohexose reductone, anhydrodihydroaminohexose reductone, and anhydrodihydro-piperidone-hexose reductone; sulfamidophenol reducing agents such as 2,6-dichloro-4-benzenesulfon-amido-phenol, and p-benzenesulfonamidophenol; 2-phenylindane-1,3-dione and the like; chromans such as 2,2-dimethyl-7-t-butyl-6-hydroxychroman, 1,4-dihydropyridines such as 2,6-dimethoxy-3,5-dicarbethoxy-1,4-dihydropyridene; bisphenols, e.g., bis(2-hydroxy-3-t-butyl-5-methylphenyl)-methane; 2,2-bis(4-hydroxy-3-methylphenyl)-propane; 4,4-ethylidene-bis(2-t-butyl-6-methylphenol); and 2,2-bis(3,5-dimethyl-4-hydroxyphenyl) propane; ascorbic acid derivatives, e.g., 1-ascorbyl-palmitate, ascorbylstearate and unsaturated aldehydes and ketones, such as benzyl and diacetyl; pyrazolidin-3-ones; and certain indane-1,3-diones.

An optimum concentration of organic reducing agent in the photothermographic element varies depending upon such factors as the particular photothermographic element, desired image, processing conditions, the particular organic silver salt and the particular oxidizing agent.

The photothermographic element can comprise a toning agent, also known as an activator-toner or toner-accelerator. (These may also function as thermal solvents or meltformers.) Combinations of toning agents are also useful in the photothermographic element. Examples of useful toning agents and toning agent combinations are described in, for example, *Research Disclosure,* June 1978, Item No. 17029 and U.S. Pat. No. 4,123,282. Examples of useful toning agents include, for example, salicylanilide, phthalimide, N-hydroxyphthalimide, N-potassium-phthalimide, succinimide, N-hydroxy-1,8-naphthalimide, phthalazine, 1-(2H)-phthalazinone, 2-acetylphthalazinone, benzanilide, and benzenesulfonamide. Prior-art thermal solvents are disclosed, for example, in U.S. Pat. No. 6,013,420 to Windender.

Post-processing image stabilizers and latent image keeping stabilizers are useful in the photothermographic element. Any of the stabilizers known in the photothermographic art are useful for the described photothermographic element. Illustrative examples of useful stabilizers include photolytically active stabilizers and stabilizer precursors as described in, for example, U.S. Pat. No. 4,459,350. Other examples of useful stabilizers include azole thioethers and blocked azolinethione stabilizer precursors and carbamoyl stabilizer precursors, such as described in U.S. Pat. No. 3,877,940.

The photothermographic elements preferably contain various colloids and polymers alone or in combination as vehicles and binders and in various layers. Useful materials are hydrophilic or hydrophobic. They are transparent or translucent and include both naturally occurring substances, such as gelatin, gelatin derivatives, cellulose derivatives, polysaccharides, such as dextran, gum arabic and the like; and synthetic polymeric substances, such as water-soluble polyvinyl compounds like poly(vinylpyrrolidone) and acrylamide polymers. Other synthetic polymeric compounds that are useful include dispersed vinyl compounds such as in latex form and particularly those that increase dimensional stability of photographic elements. Effective polymers include water insoluble polymers of acrylates, such as alkylacrylates and methacrylates, acrylic acid, sulfoacrylates, and those that have cross-linking sites. Preferred high molecular weight materials and resins include poly(vinyl butyral), cellulose acetate butyrate, poly (methylmethacrylate), poly(vinylpyrrolidone), ethyl cellulose, polystyrene, poly(vinylchloride), chlorinated rubbers, polyisobutylene, butadiene-styrene copolymers, copolymers of vinyl chloride and vinyl acetate, copolymers of vinylidene chloride and vinyl acetate, poly(vinyl alcohol) and polycarbonates. When coatings are made using organic solvents, organic soluble resins may be coated by direct mixture into the coating formulations. When coating from aqueous solution, any useful organic soluble materials may be incorporated as a latex or other fine particle dispersion.

Photothermographic elements as described can contain addenda that are known to aid in formation of a useful image. The photothermographic element can contain development modifiers that function as speed increasing compounds, sensitizing dyes, hardeners, antistatic agents, plasticizers and lubricants, coating aids, brighteners, absorbing and filter dyes, such as described in *Research Disclosure*, December 1978, Item No. 17643 and *Research Disclosure*, June 1978, Item No. 17029.

The layers of the photothermographic element are coated on a support by coating procedures known in the photographic art, including dip coating, air knife coating, curtain coating or extrusion coating using hoppers. If desired, two or more layers are coated simultaneously.

A photothermographic element as described preferably comprises a thermal stabilizer to help stabilize the photothermographic element prior to exposure and processing. Such a thermal stabilizer provides improved stability of the photothermographic element during storage. Preferred thermal stabilizers are 2-bromo-2-arylsulfonylacetamides, such as 2-bromo-2-p-tolysulfonylacetamide; 2-(tribromomethyl sulfonyl)benzothiazole; and 6-substituted-2,4-bis (tribromomethyl)-s-triazines, such as 6-methyl or 6-phenyl-2,4-bis(tribromomethyl)-s-triazine.

Imagewise exposure is preferably for a time and intensity sufficient to produce a developable latent image in the photothermographic element.

After imagewise exposure of the photothermographic element, the resulting latent image can be developed in a variety of ways. The simplest is by overall heating the element to thermal processing temperature. This overall heating merely involves heating the photothermographic element to a temperature within the range of about 90° C. to about 180° C. until a developed image is formed, such as within about 0.5 to about 60 seconds. By increasing or decreasing the thermal processing temperature a shorter or longer time of processing is useful. A preferred thermal processing temperature is within the range of about 100° C. to about 160° C. Heating means known in the photothermographic arts are useful for providing the desired processing temperature for the exposed photothermographic element. The heating means is, for example, a simple hot plate, iron, roller, heated drum, microwave heating means, heated air, vapor or the like.

It is contemplated that the design of the processor for the photothermographic element be linked to the design of the cassette or cartridge used for storage and use of the element. Further, data stored on the film or cartridge may be used to modify processing conditions or scanning of the element. Methods for accomplishing these steps in the imaging system are disclosed in commonly assigned, co-pending U.S. patent applications Ser. Nos. 09/206,586, 09/206,612, and 09/206,583 filed Dec. 7, 1998, which are incorporated herein by reference. The use of an apparatus whereby the processor can be used to write information onto the element, information which can be used to adjust processing, scanning, and image display is also envisaged. This system is disclosed in U.S. patent applications Ser. Nos. 09/206,914 filed Dec. 7, 1998 and 09/333,092 filed Jun. 15, 1999, which are incorporated herein by reference.

Thermal processing is preferably carried out under ambient conditions of pressure and humidity. Conditions outside of normal atmospheric pressure and humidity are useful.

The components of the photothermographic element can be in any location in the element that provides the desired image. If desired, one or more of the components can be in one or more layers of the element. For example, in some cases, it is desirable to include certain percentages of the reducing agent, toner, stabilizer and/or other addenda in the overcoat layer over the photothermographic image recording layer of the element. This, in some cases, reduces migration of certain addenda in the layers of the element.

In accordance with one aspect of this invention the blocked developer is incorporated in a thermographic element. In thermographic elements an image is formed by imagewise heating the element. Such elements are described in, for example, *Research Disclosure*, June 1978, Item No. 17029 and U.S. Pat. Nos. 3,080,254, 3,457,075 and 3,933,508, the disclosures or which are incorporated herein by reference. The thermal energy source and means for imaging can be any imagewise thermal exposure source and means that are known in the thermographic imaging art. The thermographic imaging means can be, for example, an infrared heating means, laser, microwave heating means or the like.

Type II: Low Volume Processing

In accordance with another aspect of this invention the blocked developer is incorporated in a photographic element intended for low volume processing. Low volume processing is defined as processing where the volume of applied developer solution is between about 0.1 to about 10 times, preferably about 0.5 to about 10 times, the volume of solution required to swell the photographic element. This processing may take place by a combination of solution application, external layer lamination, and heating. The low volume processing system may contain any of the elements described above for Type I: Photothermographic systems. In addition, it is specifically contemplated that any components described in the preceding sections that are not necessary for the formation or stability of latent image in the origination film element can be removed from the film element altogether and contacted at any time after exposure for the purpose of carrying out photographic processing, using the methods described below.

The Type II photographic element may receive some or all of the following treatments:

(I) Application of a solution directly to the film by any means, including spray, inkjet, coating, gravure process and the like.

(II) Soaking of the film in a reservoir containing a processing solution. This process may also take the form of dipping or passing an element through a small cartridge.

(III) Lamination of an auxiliary processing element to the imaging element. The laminate may have the purpose of providing processing chemistry, removing spent chemistry, or transferring image information from the latent image recording film element. The transferred image may result from a dye, dye precursor, or silver containing compound being transferred in a imagewise manner to the auxiliary processing element.

(IV) Heating of the element by any convenient means, including a simple hot plate, iron, roller, heated drum, microwave heating means, heated air, vapor, or the like. Heating may be accomplished before, during, after, or throughout any of the preceding treatments I–III. Heating may cause processing temperatures ranging from room temperature to 100° C.

Type III: Conventional Systems

In accordance with another aspect of this invention the blocked developer is incorporated in a conventional photographic element.

Conventional photographic elements in accordance with the invention can be processed in any of a number of well-known photographic processes utilizing any of a number of well-known conventional photographic processing solutions, described, for example, in *Research Disclosure* I, or in T. H. James, editor, *The Theory of the Photographic Process*, 4th Edition, Macmillan, New York, 1977. The development process may take place for any length of time and any process temperature that is suitable to render an acceptable image. In these cases the presence of blocked developers of the invention may be used to provide development in one or more color records of the element, supplementary to the development provided by the developer in the processing solution to give improved signal in a shorter time of development or with lowered laydowns of imaging materials, or to give balanced development in all color records. In the case of processing a negative working element, the element is treated with a color developer (that is one which will form the colored image dyes with the color couplers), and then with a oxidizer and a solvent to remove silver and silver halide. In the case of processing a reversal color element, the element is first treated with a black and white developer (that is, a developer which does not form colored dyes with the coupler compounds) followed by a treatment to fog silver halide (usually chemical fogging or light fogging), followed by treatment with a color developer. Preferred color developing agents are p-phenylenediamines. Especially preferred are:

4-amino N,N-diethylaniline hydrochloride,
4-amino-3-methyl-N,N-diethylaniline hydrochloride,
4-amino-3-methyl-N-ethyl-N-(2-(methanesulfonamido) ethylaniline sesquisulfate hydrate,
4-amino-3-methyl-N-ethyl-N-(2-hydroxyethyl)aniline sulfate,
4-amino-3-?-(methanesulfonamido)ethyl-N,N-diethylaniline hydrochloride and
4-amino-N-ethyl-N-(2-methoxyethyl)-m-toluidine di-p-toluene sulfonic acid.

Dye images can be formed or amplified by processes which employ in combination with a dye-image-generating reducing agent an inert transition metal-ion complex oxidizing agent, as illustrated by Bissonette U.S. Pat. Nos. 3,748,138, 3,826,652, 3,862,842 and 3,989,526 and Travis U.S. Pat. No. 3,765,891, and/or a peroxide oxidizing agent as illustrated by Matejec U.S. Pat. No. 3,674,490, *Research Disclosure*, Vol. 116, December, 1973, Item 11660, and Bissonette *Research Disclosure*, Vol. 148, August, 1976, Items 14836, 14846 and 14847. The photographic elements can be particularly adapted to form dye images by such processes as illustrated by Dunn et al U.S. Pat. No. 3,822,129, Bissonette U.S. Pat. Nos. 3,834,907 and 3,902,905, Bissonette et al U.S. Pat. No. 3,847,619, Mowrey U.S. Pat. No. 3,904,413, Hirai et al U.S. Pat. No. 4,880,725, Iwano U.S. Pat. No. 4,954,425, Marsden et al U.S. Pat. No. 4,983,504, Evans et al U.S. Pat. No. 5,246,822, Twist U.S. Pat. No. 5,324,624, Fyson EPO 0 487 616, Tannahill et al WO 90/13059, Marsden et al WO 90/13061, Grimsey et al WO 91/16666, Fyson WO 91/17479, Marsden et al WO 92/01972. Tannahill WO 92/05471, Henson WO 92/07299, Twist WO 93/01524 and WO 93/11460 and Wingender et al German OLS 4,211,460.

Development may be followed by bleach-fixing, to remove silver or silver halide, washing and drying.

Once yellow, magenta, and cyan dye image records have been formed in the processed photographic elements of the invention, conventional techniques can be employed for retrieving the image information for each color record and manipulating the record for subsequent creation of a color balanced viewable image. For example, it is possible to scan the photographic element successively within the blue, green, and red regions of the spectrum or to incorporate blue, green, and red light within a single scanning beam that is divided and passed through blue, green, and red filters to form separate scanning beams for each color record. A simple technique is to scan the photographic element point-by-point along a series of laterally offset parallel scan paths. The intensity of light passing through the element at a scanning point is noted by a sensor which converts radiation received into an electrical signal. Most generally this electronic signal is further manipulated to form a useful electronic record of the image. For example, the electrical signal can be passed through an analog-to-digital converter and sent to a digital computer together with location information required for pixel (point) location within the image. In another embodiment, this electronic signal is encoded with colorimetric or tonal information to form an electronic record that is suitable to allow reconstruction of the image into viewable forms such as computer monitor displayed images, television images, printed images, and so forth.

It is contemplated that many of imaging elements of this invention will be scanned prior to the removal of silver halide from the element. The remaining silver halide yields a turbid coating, and it is found that improved scanned image quality for such a system can be obtained by the use of scanners that employ diffuse illumination optics. Any technique known in the art for producing diffuse illumination can be used. Preferred systems include reflective systems, that employ a diffusing cavity whose interior walls are specifically designed to produce a high degree of diffuse reflection, and transmissive systems, where diffusion of a beam of specular light is accomplished by the use of an optical element placed in the beam that serves to scatter light. Such elements can be either glass or plastic that either incorporate a component that produces the desired scattering, or have been given a surface treatment to promote the desired scattering.

One of the challenges encountered in producing images from information extracted by scanning is that the number of pixels of information available for viewing is only a fraction of that available from a comparable classical photographic print. It is, therefore, even more important in scan imaging to maximize the quality of the image information available. Enhancing image sharpness and minimizing the impact of aberrant pixel signals (i.e., noise) are common approaches to enhancing image quality. A conventional technique for minimizing the impact of aberrant pixel signals is to adjust each pixel density reading to a weighted average value by factoring in readings from adjacent pixels, closer adjacent pixels being weighted more heavily.

The elements of the invention can have density calibration patches derived from one or more patch areas on a portion of unexposed photographic recording material that was subjected to reference exposures, as described by Wheeler et al U.S. Pat. No. 5,649,260, Koeng at al U.S. Pat. No. 5,563,717, and by Cosgrove et al U.S. Pat. No. 5,644,647.

Illustrative systems of scan signal manipulation, including techniques for maximizing the quality of image records, are disclosed by Bayer U.S. Pat. No. 4,553,156; Urabe et al U.S. Pat. No. 4,591,923; Sasaki et al U.S. Pat. No. 4,631,578; Alkofer U.S. Pat. No. 4,654,722; Yamada et al U.S. Pat. No. 4,670,793; Klees U.S. Pat. Nos. 4,694,342 and 4,962,542; Powell U.S. Pat. No. 4,805,031; Mayne et al U.S. Pat. No. 4,829,370; Abdulwahab U.S. Pat. No. 4,839,721; Matsunawa et al U.S. Pat. Nos. 4,841,361 and 4,937,662; Mizukoshi et al U.S. Pat. No. 4,891,713; Petilli U.S. Pat. No. 4,912,569; Sullivan et al U.S. Pat. Nos. 4,920,501 and 5,070,413; Kimoto et al U.S. Pat. No. 4,929,979; Hirosawa et al U.S. Pat. No. 4,972,256; Kaplan U.S. Pat. No. 4,977,521; Sakai U.S. Pat. No. 4,979,027; Ng U.S. Pat. No. 5,003,494; Katayama et al U.S. Pat. No. 5,008,950; Kimura et al U.S. Pat. No. 5,065,255; Osamu et al U.S. Pat. No.

5,051,842; Lee et al U.S. Pat. No. 5,012,333; Bowers et al U.S. Pat. No. 5,107,346; Telle U.S. Pat. No. 5,105,266; MacDonald et al U.S. Pat. No. 5,105,469; and Kwon et al U.S. Pat. No. 5,081,692. Techniques for color balance adjustments during scanning are disclosed by Moore et al U.S. Pat. No. 5,049,984 and Davis U.S. Pat. No. 5,541,645.

The digital color records once acquired are in most instances adjusted to produce a pleasingly color balanced image for viewing and to preserve the color fidelity of the image bearing signals through various transformations or renderings for outputting, either on a video monitor or when printed as a conventional color print. Preferred techniques for transforming image bearing signals after scanning are disclosed by Giorgianni et al U.S. Pat. No. 5,267,030, the disclosures of which are herein incorporated by reference. Further illustrations of the capability of those skilled in the art to manage color digital image information are provided by Giorgianni and Madden *Digital Color Management*, Addison-Wesley, 1998.

EXAMPLE 1

This example illustrates the preparation of a compound according to the present invention, namely the preparation of D-5 according to the following reaction scheme:

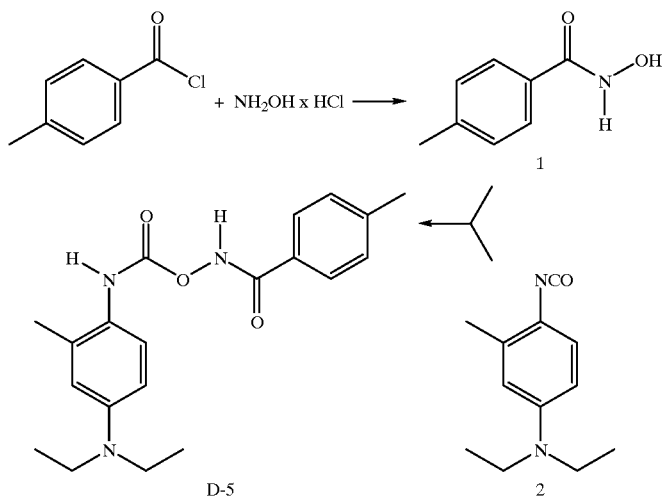

Preparation of Intermediate 1:

Neat p-toluoyl chloride (26.28 g, 170 mmol) was added in drops over a period of 1.5 h to a solution of hydroxylamine hydrochloride (11.81 g, 170 mmol) and sodium hydroxide (20 g, 0.5 mol) in water (100 mL) that was stirred in an ice/water bath. Following the addition the mixture was stirred at room temperature for 1 h and filtered. The filtrate was acidified with concentrated hydrochloric acid giving a solid which was collected, washed with water (2×30 mL) and dried in vacuo over phosphorus pentoxide for 20 h. The yield of 1 was 4.60 g (30 mmol, 18%).

Preparation of D-5

A mixture of 1 (3.02 g, 20 mmol) and 2 (4.08 g, 20 mmol) in acetonitrile (20 mL) was stirred at room temperature for 30 min giving a solid. The mixture was filtered, the solid washed in succession with acetonitrile (2×5 mL), isopropyl ether (2×10 mL) and heptane (20 mL). The yield of D-5 was 6.31 g (18 mmol, 89%), m.p.141–142° C. (dec.).

Preparation of D-3, D-4 and D-6:

Blocked developers D-3, D-4 and D-6 (Table 1) were prepared as described above for D-5.

TABLE 1

| Developer | Yield (%) | m.p. (° C.) |
|---|---|---|
| D-3 | 95 | 141–143 |
| D-4 | 57 | 128–130 |
| D-6 | 95 | 154–155 (dec.) |

Solution Reactivity Measurement Procedure

To obtain the relative reactivity of a blocked compound, an aqueous alcohol solution was used which was prepared with phosphate buffers and ethanol at ionic strength 0.125 and pH 4.37. A blocked developer compound, e.g., D-3 was dissolved in the solution at $10^{-4}$ M, and heated at 75° C. for 5.0 min in a capped vial. The reaction mixture was then cooled in an ice bath, and 0.25 mL of the mixture rapidly mixed with 0.75 mL of a 6% Triton X-100 solution of Coupler-1 (0.002 M) and 0.50 mL of a pH 10 carbonate buffer (ionic strength 0.5) containing 0.004 M of $K_3Fe(CN)_6$. The magenta dye formed is quantified in a 1-cm cell with a spectrophotometer at 568 nm and the relative reactivity ($k'_{rel}$) of the compound can be calculated with the equation:

$$k'_{rel} = \ln\frac{A_\infty - A_0}{A - A_0}$$

Where A is the absorbance at 568 nm, and the subscripts donate time 0 or infinity (∞).

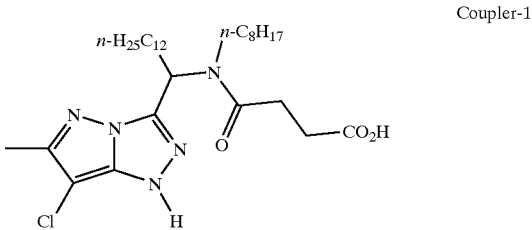

Coupler-1

The relative reactivities for various blocked developers according to the present invention were thus obtained at 75°

C. are listed in Table 2 below with the assignment of 1.0 for the comparative compound DC-2 at pH 7.32. It is noted that the comparative compound is very essentially non-reactive at pH 4.37. As can be seen, the inventive blocked developers exhibit higher reactivity even at low pH than the comparative compound at much higher pH.

In Table 2 below, the base structure is that of structure below, wherein the R substituent is varied.

TABLE 2

[base structure with R substituent]

| Substituent R | Inventive | $k_{rel}$ (pH 4.37) | Comparative | $k_{rel}$ (pH 7.32) |
|---|---|---|---|---|
| H | D3 | 3.51 | DC-2 | 1.0 |
| MeO | D4 | 6.46 | | |
| Me | D5 | 5.77 | | |
| Cl | D6 | 9.30 | | |

Photographic Examples:

Processing conditions are as described in the examples. Unless otherwise stated, the silver halide was removed after development by immersion in Kodak Flexicolor Fix solution. In general, an increase of approximately 0.2 in the measured density would be obtained by omission of this step. The following components are used in the examples. Also included is a list of all of the chemical structures.

Silver Salt Dispersion SS-1:

A stirred reaction vessel was charged with 431 g of lime processed gelatin and 6569 g of distilled water. A solution containing 214 g of benzotriazole, 2150 g of distilled water, and 790 g of 2.5 molar sodium hydroxide was prepared (Solution B). The mixture in the reaction vessel was adjusted to a pAg of 7.25 and a pH of 8.00 by additions of Solution B, nitric acid, and sodium hydroxide as needed.

A 41 solution of 0.54 molar silver nitrate was added to the kettle at 250 cc/minute, and the pAg was maintained at 7.25 by a simultaneous addition of solution B. This process was continued until the silver nitrate solution was exhausted, at which point the mixture was concentrated by ultrafiltration. The resulting silver salt dispersion contained fine particles of silver benzotriazole.

Emulsion E-1:

A silver halide tabular emulsion with a composition of 97% silver bromide and 3% silver iodide was prepared by conventional means. The resulting emulsion had an equivalent circular diameter of 0.6 microns and a thickness of 0.09 microns. This emulsion was spectrally sensitized to blue light by addition of dye SY-1 dye and then chemically sensitized for optimum performance.

Melt Former Dispersion:

A dispersion of salicylanilide was prepared by the method of ball milling. To a total 20 g sample was added 3.0 gm salicylanilide solid, 0.20 g polyvinyl pyrrolidone, 0.20 g TRITON X-200 surfactant, 1.0 g gelatin, 15.6 g distilled water, and 20 ml of zirconia beads. The slurry was ball milled for 48 hours. Following milling, the zirconia beads were removed by filtration. The slurry was refrigerated prior to use. For preparations on a larger scale, the salicylanilide was media—milled to give a final dispersion containing 30% Salicylanilide, with 4% TRITON X 200 surfactant and 4% polyvinyl pyrrolidone added relative to the weight of Salicylanilide. In some cases the dispersion was diluted with water to 25% Salicylanilide or gelatin (5% of total) was added and the concentration of Salicylanilide adjusted to 25%. If gelatin is added, biocide (KATHON) is also added.

Coupler Dispersion CDM-1:

An oil based coupler dispersion was prepared by conventional means containing coupler M-1 and tricresyl phosphate at a weight ratio of 1:0.5.

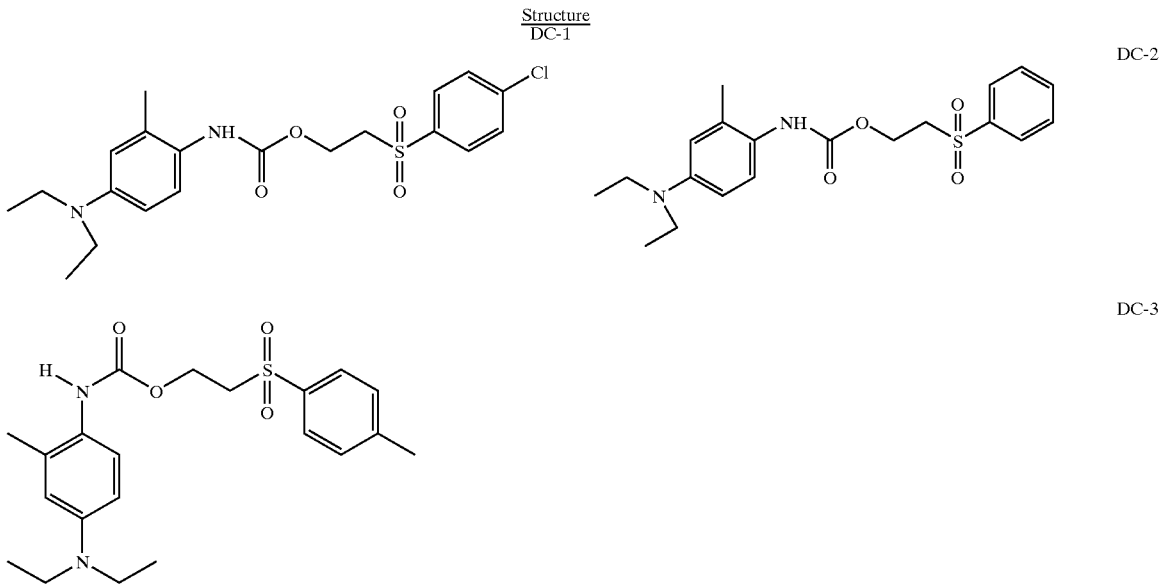

Structure
DC-1

DC-2

DC-3

-continued

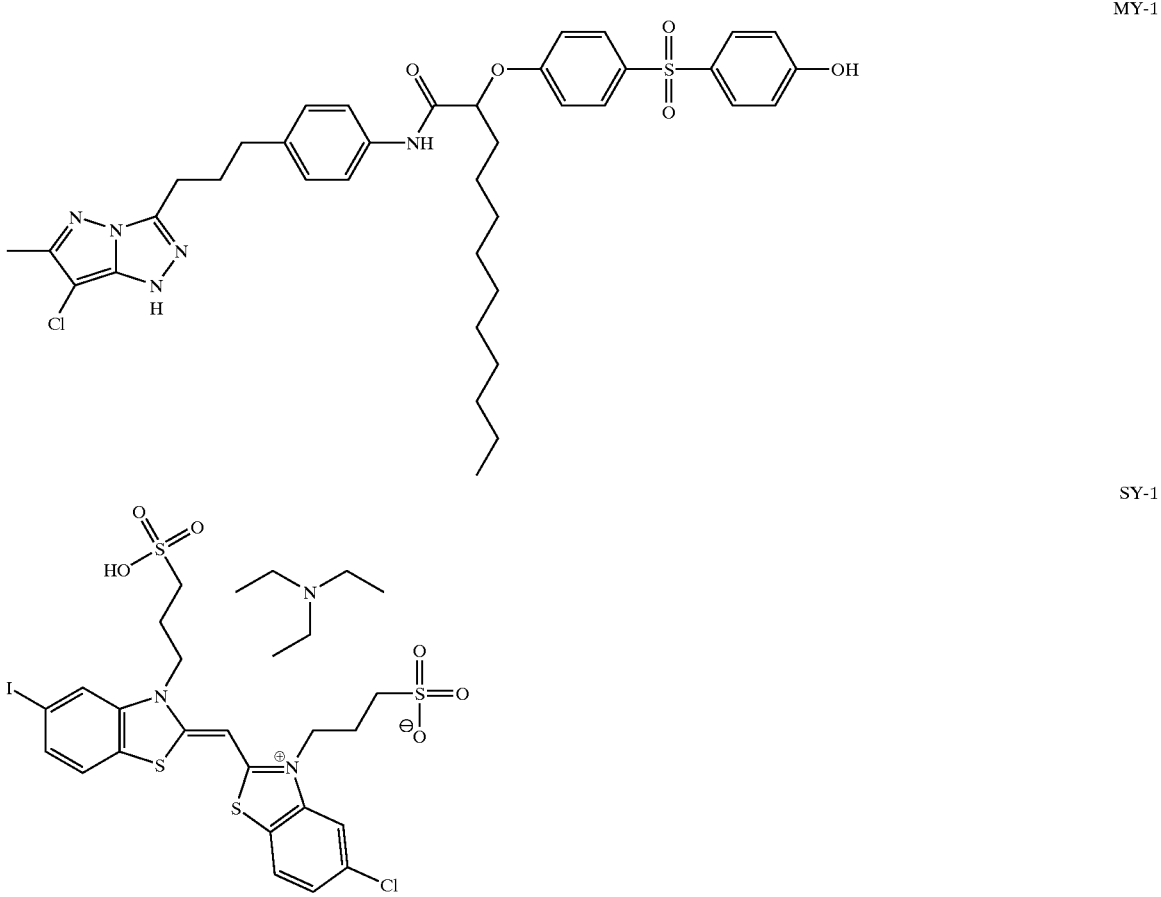

MY-1

SY-1

EXAMPLE 2

All coatings were prepared according to the standard format listed in Table 2-1 below, with variations consisting of changing the incorporated developer. All coatings were prepared on a 7 mil thick poly(ethylene terephthalate) support.

Developers were ball-milled in an aqueous slurry for 3 days using Zirconia beads in the following formula. For each gram of incorporated developer, 0.2 g of sodium tri-isopropylnaphthalene sulfonate, 10 g of water, and 25 ml of beads were added. Following milling, the zirconia beads were removed by filtration, The slurry was refrigerated prior to use.

TABLE 2-1

| Component | Laydown |
| --- | --- |
| Silver (from emulsion E-1) | 0.54 g/m$^2$ |
| Silver (from silver salt SS-1) | 0.54 g/m$^2$ |
| Coupler M-1 (from coupler dispersion CDM-1) | 0.54 g/m$^2$ |
| Developer | 1.03 mmol/m$^2$ |
| Salicylanilide | 0.86 g/m$^2$ |
| 1-phenyl-5-mercaptotetrazole | 0.32 g/m$^2$ |
| Lime processed gelatin | 4.31 g/m$^2$ |

The resulting coatings were exposed through a step wedge to a 3.04 log lux light source at 3000K filtered by Daylight 5A and Wratten 2B filters. The exposure time was 1 second. After exposure, the coating was thermally processed by contact with a heated platen for 20 seconds. A number of strips were processed at a variety of platen temperatures in order to yield an optimum strip process condition. From this data, the following parameter was obtained:

Onset Temperature, $T_o$:

Corresponds the temperature required to produce a maximum density (Dmax) of 0.5. Lower temperatures indicate more active developers which are desirable. Coatings employing comparative and inventive blocked developers were created and analyzed according to the above procedure. The results of this analysis are shown in Table 2-2.

TABLE 2-2

| Coating | Developer | $T_o$ (° C.) |
| --- | --- | --- |
| C-1-1 (comparative) | DC-1 | 161 |
| C-1-2 (comparative) | DC-2 | 170 |
| C-1-3 (comparative) | DC-3 | 174 |
| I-1-1 (inventive) | D-3 | 153.0 |
| I-1-2 (inventive) | D-4 | 140.9 |
| I-1-1 (inventive) | D-5 | 148.6 |
| I-1-2 (inventive) | D-6 | 154.0 |

In some instances, the $T_o$ in Table 2-2 above is obtained by appropriate extrapolation of the available data points. It can be seen that the inventive developers offer reduced onset temperature relative to the comparative developers, which is desirable.

EXAMPLE 3

All coatings in this example were prepared according to the standard format listed in Table 3-1 below, with variations consisting of changing the incorporated developer. All coatings were prepared on a 7 mil thick poly(ethylene terephthalate) support. The developers were milled and incorporated as described in Example 2.

TABLE 3-1

| Component | Laydown |
|---|---|
| Silver (from emulsion E-1) | 0.54 g/m$^2$ |
| Silver (from silver salt SS-1) | 0.54 g/m$^2$ |
| Coupler M-1 (from coupler dispersion CDM-1) | 0.54 g/m$^2$ |
| Base Releaser (Guanidine trichloroacetate) | 0.81 g/m$^2$ |
| Developer | 1.03 mmol/m$^2$ |
| Salicylanilide | 0.86 g/m$^2$ |
| 1-phenyl-5-mercaptotetrazole | 0.32 g/m$^2$ |
| Lime processed gelatin | 4.31 g/m$^2$ |

The resulting coatings were exposed through a step wedge to a 3.04 log lux light source at 3000K filtered by Daylight 5A and Wratten 2B filters. The exposure time was 1 second. After exposure, the coating was thermally processed by contact with a heated platen for 20 seconds. A number of strips were processed at a variety of platen temperatures in order to yield an optimum strip process condition. From this data, the parameter $T_o$ as described in example 1 was obtained. The performance of coatings in this example are shown in Table 3-2.

TABLE 3-2

| Coating | Developer | $T_o$ (° C.) |
|---|---|---|
| C-2-1 (comparative) | DC-1 | 140 |
| C-2-2 (comparative) | DC-2 | 141 |
| C-2-3 (comparative) | DC-3 | 143 |
| I-2-1 (inventive) | D-3 | 135.0 |
| I-2-2 (inventive) | D-4 | 128.1 |
| I-2-3 (inventive) | D-5 | 128.3 |
| I-2-4 (inventive) | D-6 | 136.0 |

As can be seen from Table 3-2, the developers of this invention offer reduced onset temperature relative to the comparative developers, which is desirable.

The invention has been described in detail with particular reference to certain preferred embodiments thereof, but it will be understood that variations and modifications can be effected within the spirit and scope of the invention.

What is claimed is:

1. An imaging element comprising an imaging layer having associated therewith a compound represent by the following structure:

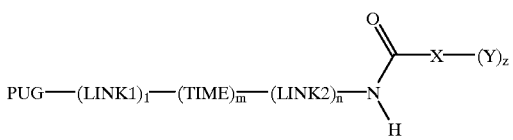

wherein:
PUG is a photographically useful group connected to the rest of the molecule via a heteroatom;
TIME is a timing group;
l is 0 or 1;
m is 0 or 1;
provided that when m=0 then l=0;
X is carbon atom, aryl group or heteroaromatic group; and
Y is z independently selected substituents, electron donating or electron withdrawing, and z is 0 to 7; and wherein additionally two substituents Y can join to form a ring; and
wherein LINK1 and LINK2 are linking groups independently having the following structure:

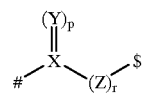

wherein
X represents carbon or sulfur;
Y represents oxygen, sulfur or N—R$_1$, where R$_1$ is substituted or unsubstituted alkyl or substituted or unsubstituted aryl;
p is 1 or 2;
Z represents carbon, oxygen or sulfur;
r is 0 or 1;
with the proviso that when X is carbon, both p and r are 1, when X is sulfur, Y is oxygen, p is 2 and r is 0;
# denotes the bond to PUG;
$ denotes the bond to TIME.

2. The imaging element of claim 1, wherein the compound is represented by the following structure:

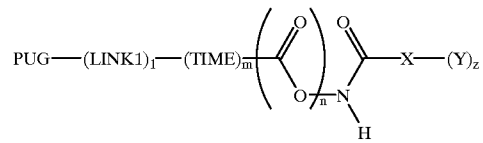

wherein the groups are as defined in claim 1.

3. The imaging element of claim 1, wherein the compound is represented by the following structure:

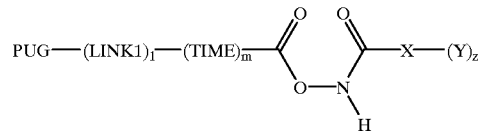

wherein the groups are as defined in claim 1.

4. An imaging element according to claim 1, wherein PUG is a coupler, development inhibitor, bleach accelerator, bleach inhibitor, inhibitor releasing developer, dye or dye precursor, developing agent, silver ion fixing agent, electron transfer agent, silver halide solvent, silver halide complexing agent, reductone, image toner, pre-processing or post-processing image stabilizer, hardener, tanning agent, fogging agent, ultraviolet radiation absorber, nucleator, chemical or spectral sensitizer, desensitizer, surfactant, or precursors thereof.

5. An imaging element according to claim 4, wherein PUG is a developer.

6. An imaging element according to claim 5, wherein the developer is an aminophenol, phenylenediamine, hydroquinone, pyrazolidinone, or hydrazine.

7. An imaging element according to claim 6, wherein the developer is a phenylenediamine.

8. An imaging element according to claim 1, where the LINK1 and LINK2 are independently selected from the following groups:

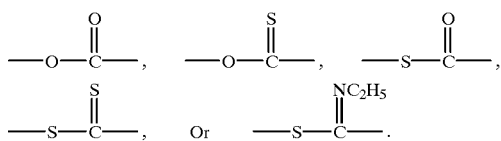

9. An imaging element according to claim 8, wherein LINK1 and LINK2 is

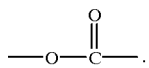

10. An imaging element according to claim 1, wherein TIME is a timing group selected from (1) groups utilizing an aromatic nucleophilic substitution reaction; (2) groups utilizing the cleavage reaction of a hemiacetal; (3) groups utilizing an electron transfer reaction along a conjugated system; or (4) groups using an intramolecular nucleophilic substitution reaction.

11. An imaging element according to claim 1, wherein the compound is the following structure:

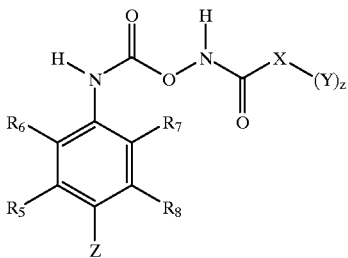

wherein:
- Z is OH or $NR_2R_3$, where $R_2$ and $R_3$ are independently hydrogen or a substituted or unsubstituted alkyl group or $R_2$ and $R_3$ are connected to form a ring;
- $R_5$, $R_6$, $R_7$, and $R_8$ are independently hydrogen, halogen, hydroxy, amino, alkoxy, carbonamido, sulfonamido, alkylsulfonamido or alkyl, or $R_5$ can connect with $R_3$ or $R_6$ and/or $R_8$ can connect to $R_2$ or $R_7$ to form a ring;
- X is carbon atom, aryl group or heteroaromatic group;
- Y is a independently selected substituents, both electron donating and electron withdrawing, and z is 0 to 7; and wherein additionally two substituents Y can join to form a ring.

12. An imaging element according to claim 1, wherein the compound is in the imaging layer.

13. An imaging element according to claim 1, wherein the element is a photothermographic element.

14. An imaging element according to claim 13, wherein the photothermographic element contains an imaging layer comprising a light sensitive silver halide emulsion and a non-light sensitive organic silver salt oxidizing agent.

15. An imaging element according to claim 13, which photothermographic element is a color imaging element comprising at least three light-sensitive units that have their individual sensitivities in different wavelength regions.

16. An imaging element according to claim 15, wherein each unit comprises at least one light-sensitive silver halide emulsion, binder, and dye-providing coupler.

17. An imaging element according to claim 1, wherein the imaging element is a thermographic imaging element.

18. An imaging element according to claim 17, wherein the imaging element contains at least unit comprising a non-light sensitive organic silver salt oxidizing agent and a reducing agent.

19. A method of image formation comprising the step of developing a latent image in an imagewise exposed imaging element according to claim 1.

20. A method according to claim 19, wherein development comprises heating said imagewise exposed element at a temperature between about 100° C. and about 160° C. for a time ranging from about 0.5 to about 60 seconds.

21. A method according to claim 20, wherein development comprises treating said imagewise exposed element to a volume of processing solution that is between about 0.1 and about 10 times the volume of solution required to fully swell the photographic element.

22. A method according to claim 20, wherein development is accompanied by the application of a laminate sheet containing processing chemicals.

23. A method according to claim 20, wherein the developing is conducted at a processing temperature between about 20° C. and about 100° C.

24. A method according to claim 21, wherein the processing solution comprises aqueous base, aqueous acid, or pure water.

25. A method according to claim 19, wherein development comprises treating said imagewise element with a conventional photographic processing solution.

26. A method of image formation comprising the step of scanning an imagewise exposed and developed imaging element according to claim 1 to form a first electronic image representation of said imagewise exposure.

27. A method of image formation comprising the step of digitizing a first electronic image representation formed from an imagewise exposed, developed, and scanned imaging element formulated according to claim 1 to form a digital image.

28. A method of image formation comprising the step of modifying a first electronic image representation formed from and imagewise exposed, developed, and scanned imaging element formulated according to claim 1 to form a second electronic image representation.

29. A method of image formation comprising storing, transmitting, printing, or displaying and electronic image representation of an image derived from an imagewise exposed, developed, scanned imaging element formulated according to claim 1.

30. A method according to claim 29, wherein printing the image is accomplished with any of the following printing technologies: electrophotography; inkjet; thermal dye sublimation; or CRT or LED printing to sensitized photographic paper.

31. The method of claim 30 comprising the steps of:
thermally developing an imagewise exposed photographic element having a compound according to claim 1 that enables release of a photographically useful group on thermal activation to form a developed image;
scanning said developed image to form a first electronic image representation from said developed image;
digitizing said first electronic record to form a digital image;
modifying said digital image to forma second electronic image representation; and
storing, transmitting, printing or displaying said second electronic image representation.

* * * * *